(12) United States Patent
Lovat et al.

(10) Patent No.: US 7,532,835 B2
(45) Date of Patent: *May 12, 2009

(54) METHODS AND SYSTEMS FOR REMOTE CONFIGURATION-BASED IMAGING DEVICE ACCOUNTING

(75) Inventors: David J. Lovat, Huntington Beach, CA (US); Hanzhong Zhang, Cypress, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 28 days.

This patent is subject to a terminal disclaimer.

(21) Appl. No.: 11/193,147

(22) Filed: Jul. 29, 2005

(65) Prior Publication Data

US 2006/0078346 A1    Apr. 13, 2006

Related U.S. Application Data

(60) Provisional application No. 60/704,066, filed on Jul. 28, 2005.

(51) Int. Cl.
*G03G 21/02* (2006.01)

(52) U.S. Cl. .......................................................... 399/79

(58) Field of Classification Search ................... 399/79
See application file for complete search history.

(56) References Cited

U.S. PATENT DOCUMENTS

| | | | |
|---|---|---|---|
| 5,085,587 A | 2/1992 | DesForges et al. | |
| 5,323,393 A | 6/1994 | Barrett et al. | |
| 5,659,845 A | 8/1997 | Krist et al. | |
| 5,717,439 A | 2/1998 | Levine et al. | |
| 5,726,883 A | 3/1998 | Levine et al. | |
| 5,745,883 A | 4/1998 | Krist et al. | |
| 5,760,775 A * | 6/1998 | Sklut et al. | 715/839 |
| 5,774,678 A | 6/1998 | Motoyama | |
| 5,799,206 A | 8/1998 | Kitagawa et al. | |
| 5,832,264 A | 11/1998 | Hart et al. | |
| 5,956,698 A | 9/1999 | Lacheze et al. | |
| 5,968,127 A | 10/1999 | Kawabe et al. | |
| 5,999,708 A | 12/1999 | Kajita | |
| 6,042,384 A | 3/2000 | Loiacono | |
| 6,069,706 A | 5/2000 | Kajita | |
| 6,075,860 A | 6/2000 | Ketcham | |

(Continued)

FOREIGN PATENT DOCUMENTS

EP          1160657          12/2001

(Continued)

OTHER PUBLICATIONS

Canon USA, Inc.; MEAP Multifunctional Embedded Application Platform; Aug. 2004; developersupport.canon.com/Web_MEAP_Presentation.pdf.

(Continued)

*Primary Examiner*—David M Gray
*Assistant Examiner*—Bryan Ready
(74) *Attorney, Agent, or Firm*—Krieger Intellectual Property, Inc.; Scott C. Krieger

(57) ABSTRACT

Aspects of the present invention relate to systems, methods and devices for configuration-based imaging device accounting wherein costs are calculated based on detailed job parameters derived from job configuration data.

20 Claims, 20 Drawing Sheets

U.S. PATENT DOCUMENTS

| | | | |
|---|---|---|---|
| 6,118,546 A | 9/2000 | Sanchez | |
| 6,178,308 B1 | 1/2001 | Bobrow et al. | |
| 6,199,080 B1 | 3/2001 | Nielsen | |
| 6,216,113 B1* | 4/2001 | Aikens et al. | 705/34 |
| 6,301,016 B1 | 10/2001 | Matsueda et al. | |
| 6,311,040 B1 | 10/2001 | Kucinski et al. | |
| 6,426,798 B1 | 7/2002 | Yeung | |
| 6,433,883 B1 | 8/2002 | Kajita | |
| 6,526,258 B2 | 2/2003 | Bejar et al. | |
| 6,567,179 B1 | 5/2003 | Sato et al. | |
| 6,590,673 B2 | 7/2003 | Kadowaki | |
| 6,597,469 B1 | 7/2003 | Kuroyanagi | |
| 6,604,157 B1 | 8/2003 | Brusky et al. | |
| 6,636,929 B1 | 10/2003 | Frantz et al. | |
| 6,721,286 B1 | 4/2004 | Williams et al. | |
| 6,749,434 B2 | 6/2004 | Stuppy | |
| 6,836,623 B2 | 12/2004 | Imai | |
| 6,836,845 B1 | 12/2004 | Lennie et al. | |
| 6,850,252 B1 | 2/2005 | Hoffberg | |
| 6,873,429 B2 | 3/2005 | Matsuura | |
| 6,874,010 B1 | 3/2005 | Sargent | |
| 6,948,175 B1 | 9/2005 | Fong et al. | |
| 6,951,303 B2 | 10/2005 | Peterson et al. | |
| 7,181,017 B1 | 2/2007 | Nagel et al. | |
| 2001/0021945 A1 | 9/2001 | Matsuura | |
| 2002/0099796 A1 | 7/2002 | Chou | |
| 2002/0112037 A1 | 8/2002 | Koss | |
| 2002/0120792 A1 | 8/2002 | Blair | |
| 2002/0138666 A1 | 9/2002 | Fujisawa | |
| 2002/0145627 A1 | 10/2002 | Whitmarsh | |
| 2002/0147858 A1 | 10/2002 | Motoyama et al. | |
| 2002/0152235 A1 | 10/2002 | Motoyama et al. | |
| 2002/0152302 A1 | 10/2002 | Motoyama et al. | |
| 2002/0171857 A1 | 11/2002 | Hisatomi | |
| 2003/0007170 A1 | 1/2003 | Kajita et al. | |
| 2003/0011633 A1 | 1/2003 | Conley | |
| 2003/0011640 A1 | 1/2003 | Green | |
| 2003/0014515 A1 | 1/2003 | Motoyama et al. | |
| 2003/0048473 A1 | 3/2003 | Rosen | |
| 2003/0049037 A1* | 3/2003 | Sadowara et al. | 399/27 |
| 2003/0063313 A1 | 4/2003 | Ito | |
| 2003/0084114 A1 | 5/2003 | Simpson et al. | |
| 2003/0088642 A1 | 5/2003 | Price et al. | |
| 2003/0123112 A1 | 7/2003 | Kajita et al. | |
| 2003/0142351 A1 | 7/2003 | Sakura | |
| 2003/0164987 A1 | 9/2003 | Enomoto et al. | |
| 2003/0184590 A1 | 10/2003 | Will | |
| 2003/0184782 A1 | 10/2003 | Perkins | |
| 2003/0223766 A1* | 12/2003 | Imai | 399/8 |
| 2003/0225894 A1 | 12/2003 | Ito | |
| 2004/0012628 A1 | 1/2004 | Kropf et al. | |
| 2004/0012644 A1 | 1/2004 | Allen et al. | |
| 2004/0061729 A1 | 4/2004 | Green | |
| 2004/0080778 A1 | 4/2004 | Ito et al. | |
| 2004/0105104 A1 | 6/2004 | Ishikawa et al. | |
| 2004/0105122 A1 | 6/2004 | Schaeffer | |
| 2004/0109028 A1 | 6/2004 | Stern et al. | |
| 2004/0113941 A1 | 6/2004 | Sliwa et al. | |
| 2004/0117784 A1 | 6/2004 | Endoh | |
| 2004/0169881 A1 | 9/2004 | Sato | |
| 2004/0203358 A1 | 10/2004 | Anderson | |
| 2004/0212823 A1 | 10/2004 | Chavers et al. | |
| 2004/0223778 A1* | 11/2004 | Zwiefelhofer | 399/79 |
| 2004/0236862 A1 | 11/2004 | Ito | |
| 2004/0255263 A1 | 12/2004 | Ando | |
| 2005/0055475 A1 | 3/2005 | MacKay et al. | |
| 2005/0080649 A1 | 4/2005 | Alvarez et al. | |
| 2005/0108353 A1 | 5/2005 | Yamamoto | |
| 2005/0114766 A1 | 5/2005 | Yamamoto | |
| 2005/0129423 A1* | 6/2005 | Lester et al. | 399/79 |
| 2006/0038004 A1 | 2/2006 | Rielly et al. | |
| 2006/0154227 A1 | 7/2006 | Rossi et al. | |
| 2007/0022180 A1 | 1/2007 | Cocotis et al. | |
| 2007/0173266 A1 | 7/2007 | Barnes, Jr. | |

FOREIGN PATENT DOCUMENTS

| | | |
|---|---|---|
| JP | 08234945 | 9/1996 |
| JP | 2002330253 | 11/2002 |
| JP | 2003022258 | 1/2003 |
| JP | 2003050781 | 2/2003 |
| JP | 2003260853 | 9/2003 |
| JP | 2004240752 | 8/2004 |
| JP | 2004310326 | 11/2004 |
| JP | 2005014591 | 1/2005 |
| JP | 2005033460 | 2/2005 |
| WO | WO0118754 A1 | 3/2001 |
| WO | WO0198864 | 12/2001 |

OTHER PUBLICATIONS

Canon USA, Inc.; MEAP: FAQ; accessed on Jul. 2004, pub. date unknown; developersupport.canon.com/MEAP.htm.

Xerox, Inc.; XEROX FreeFlow digital workflow collection; 2003; www.xerox.com/downloads/usa/en/s/solutions_digital_workflow_whitepaper_sdk.pdf.

Ricoh Company, Ltd.; Ricoh's Medium-Term Management Plan; Mar. 19, 2002; www.ricoh.com/IR/data/pre/pdf/ir_pre2002.pdf.

Ricoh Company, Ltd.; White Paper: Embedded Software Architecture SDK; Jun. 25, 2003; www.ricoh-usa.com/products/concept/esa.asp?catname=ESA.

Hewlett-Packard Company; JetCAPS Scan2Folder; 2003; www.jetcaps.se/resources/datasheets/ds_scan2folder.pdf.

Hewlett-Packard Company; JetCAPS chai applications; Dec. 9, 2002; www.stethos.com/chai/data/d_us_chai.pdf.

U.S. Appl. No. 10/961,911—Office Action dated Apr. 16, 2008.
U.S. Appl. No. 10/961,594—Office Action dated Jan. 7, 2008.
U.S. Appl. No. 11/193,077—Office Action dated Apr. 6, 2007.
U.S. Appl. No. 11/192,836—Office Action dated Dec. 5, 2007.
U.S. Appl. No. 11/192,836—Office Action dated Jul. 3, 2007.
U.S. Appl. No. 11/192,836—Office Action dated Jan. 30, 2007.

* cited by examiner

METHODS AND SYSTEMS FOR REMOTE CONFIGURATION-BASED IMAGING DEVICE ACCOUNTING

RELATED REFERENCES

This application claims the benefit of U.S. Provisional Patent Application No. 60/704,066, entitled "Methods and Systems for Imaging Device Applications," filed Jul. 28, 2005.

FIELD OF THE INVENTION

Embodiments of the present invention comprise methods and systems for imaging device accounting.

BACKGROUND

Imaging devices such as printers, copiers, scanners and fax machines can have a wide array of functions and capabilities to fit specific uses or combinations of uses. Imaging devices often take the form of a multi-function peripheral device (MFP) that combines the functions of two or more of the traditionally separated imaging devices. An MFP may combine any number of imaging devices, but typically comprises the functions of a printer, scanner, copier and fax machine.

Some imaging devices may contain computing resources for data storage and processing such as processors, hard disk drives, memory and other devices. As imaging devices add more features and functions, they become more costly and complex.

More complex imaging devices and MFPs may comprise network connectivity to provide communication with other computing devices, such as personal computers, other imaging devices, network servers and other apparatus. This connectivity allows the imaging device to utilize off-board resources that are available on a connected network.

Imaging devices typically have a user input panel with an array of buttons, knobs and other user input devices. Some devices also have a display panel, which can be for display only or can be a touch panel display that enables user input directly on the display.

Devices with touch panel displays or displays with buttons arranged in cooperation with the display can display menu data that may be selected by user input. This menu data is typically driven by an on-board server module within the imaging device.

BRIEF SUMMARY OF THE INVENTION

Some embodiments of the present invention comprise systems, methods and devices for determining imaging job costs, fees or charges based on detailed imaging job parameters.

Some embodiments of the present invention comprise systems, methods and devices for informing a user of accounting restrictions that are related to job configuration data input by a user.

Some embodiments of the present invention comprise systems, methods and devices for automatically modifying an imaging job to comply with accounting restrictions.

Some embodiments of the present invention comprise systems, methods and devices for interacting with a remote computing device from an imaging device. These embodiments comprise remote computing devices configured to communicate with imaging devices, imaging devices configured to communicate with remote computing devices and systems comprising various combinations of remote computing devices in communication with imaging devices.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Figure 1:
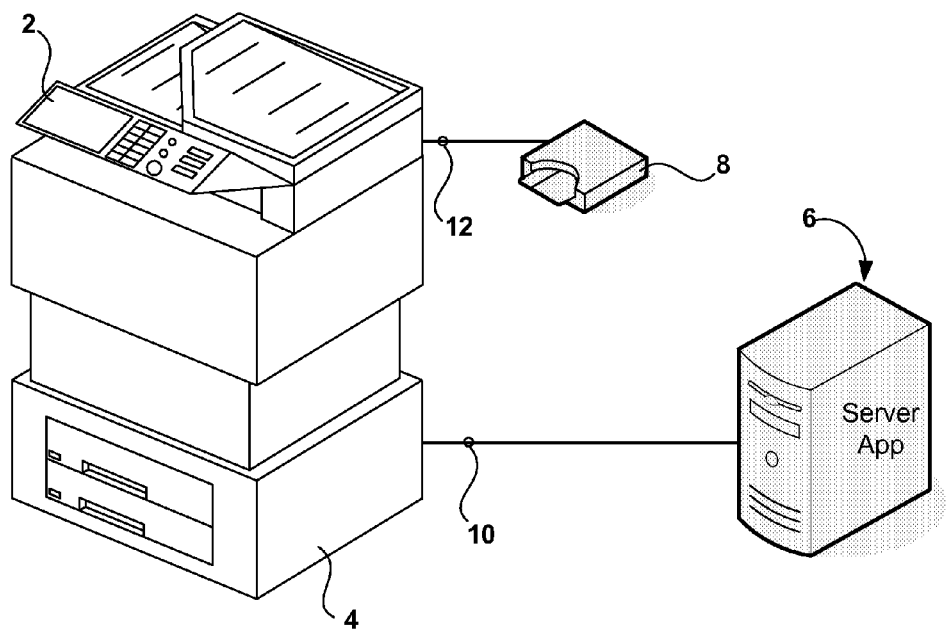
FIG. 1 is a diagram of an embodiment of the present invention comprising an imaging device in connection with a remote computing device.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Embodiments of the present invention comprise interfaces and architecture that integrate imaging devices with remote computing device applications and environments to provide solutions that may not be possible solely with an imaging device alone. Some embodiments comprise an infrastructure and set of interfaces that allow applications on a network to programmatically control imaging device functions and interact with a user through an imaging device input panel. Software functions that are not practical within the imaging device can be performed on the server but are accessible from the imaging device.

For the purposes of this specification and claims, an imaging device (IDev) may be described as a device that performs an imaging function. Imaging functions comprise scanning, printing, copying, image transmission (sending and receiving), image conversion and other functions. Exemplary imaging devices comprise printers, copiers, facsimile machines, scanners, computing devices that transmit, convert or process images and other devices. An IDev may also perform multiple imaging functions. For example, and not by way of limitation, a multi-function peripheral device (MFP), which typically has the capability to perform a plurality of functions comprising a printer, scanner, copier and/or a facsimile machine or image transmitter/receiver, is a type of imaging device. Other MFP imaging devices may comprise other combinations of functions and still qualify as an IDev.

For the purposes of this specification and claims, a remote computing device (RCD) is a device capable of processing data and communicating with other devices through a communications link. An RCD is a remote device because it requires a communications link, such as a network connection, a telephone line, a serial cable or some other wired or wireless link to communicate with other devices such as an imaging device. Some exemplary RCDs are network servers, networked computers and other processing and storage devices that have communications links.

Figure 2:
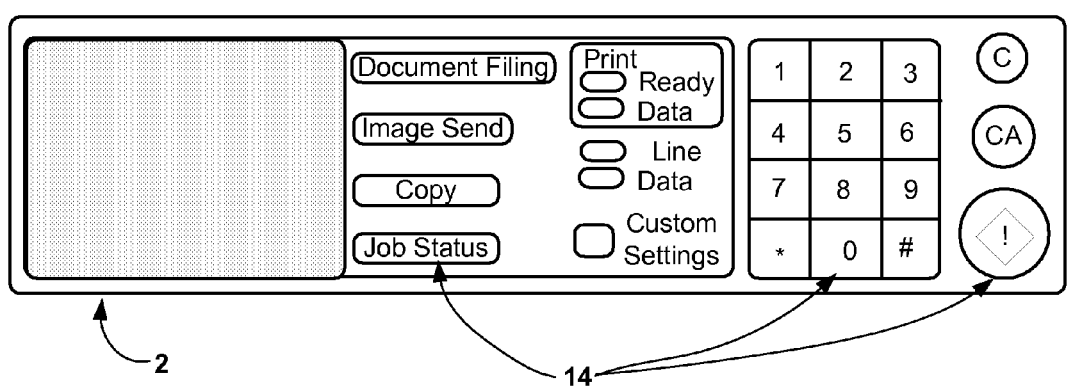
FIG. 2 is an image of an exemplary user interface for an imaging device.

Some embodiments of the present invention may be described with reference to FIGS. 1 & 2. These embodiments comprise an imaging device (IDev) 4 that may be a multi-function peripheral device (MFP) or a single function device. The imaging device 4 further comprises a user interface (UI) panel 2, which may comprise input buttons 14 and a display device 12 or may comprise a touch panel system with or without buttons 14. User input and display may also be performed through a separate UI device 8, which may be connected to the imaging device 4 by a communication link 12, such as a USB connection, a network cable, a wireless connection or some other communications link. UI device 8 may comprise an input device, such as a keyboard or buttons as well as a display device, which may also be a touch screen panel. UI device 8 may also comprise an interface for transfer of instructions that are input to the device 8 from a remote input device. This form of UI device 8 may comprise memory sticks, USB memory cards and other storage devices that may be configured to store input for transfer to an imaging device.

These embodiments further comprise a remote computing device (RCD) 6 that is linked to the imaging device 4 via a communications link 10, such as a network connection. This network connection may be a typical wired connection or a wireless link.

Embodiments of the present invention may provide menu data from the RCD 6 to the imaging device UI panel 2 or remote panel 8 via the network connection 10. Once this menu data is fed to the imaging device 4, an UI panel 2, 8 on the imaging device 4 may be used to interact with applications that run on the remote computing device 6. User input received from UI panels 2, 8 may be returned directly to the remote computing device 6.

A Web Service is a software application identified by a Uniform Resource Identifier (URI), whose interfaces and binding are capable of being defined, described and discovered by Extensible Markup Language (XML) artifacts and supports direct interactions with other software applications using XML based messages via Internet-based protocols.

An application on the remote computing device 6 may use one or more Web Services to control various features in the imaging device 4, such as enabling, disabling or setting device values or controlling device functions.

Embodiments of the present invention allow network applications running on remote computing devices to interact with the user of the imaging device through the imaging device I/O panel. These embodiments allow imaging device user interface (UI) control (i.e., touch panel, button/display) by applications. Some embodiments may also integrate custom display screens or menus with the native imaging device UI. Embodiments may hand off control of imaging device functions between standard operation modes performed on the imaging device in response to user input to an imaging device UI and open systems modes that utilize network resources, such as applications on RCDs, through user input at the imaging device UI.

Embodiments of the present invention comprise network-based applications that have full control over the imaging device UI to display text and graphics in any format. In these embodiments, the application can programmatically display buttons, textboxes, graphics, etc. in any layout desired.

In some embodiments, the UI layout is easy to program using a standard language, such as a markup language. These languages comprise Hypertext Markup Language (HTML), Extensible Markup Language (XML), Wireless Markup Language (WML), Extensible Hypertext Markup Language (XHTML) and other languages.

In some embodiments of the present invention a remote computing device application or server application is able to request a keyboard UI to be displayed on the imaging device display 12, 8. In some embodiments, this functionality is available on the imaging device and does not need to be recreated by remote computing device applications. In some embodiments, the remote computing device may define the keyboard prompt and default values. These embodiments may comprise a remote computing device that is able to rename imaging device UI buttons, such as the OK and Cancel buttons as well as define additional buttons.

In some embodiments, menu templates may be served to the imaging device UI by the imaging device itself 4 or from a remote computing device 6.

External Authorization Application

Some embodiments of the present invention may comprise a remote computing device application that is registered as the External Authorization server. The External Authorization application may control access to the imaging device and may have top-level control of the UI. UI control may be given to this application in the same manner that control is given to an internal auditor.

In these embodiments, when an imaging device system boots, it checks to see if an External Authorization application is registered. If so, the imaging device is placed in disabled mode and the application is contacted to take control of the UI. If the External Authorization server is not available, an error message may be displayed and the device may remain disabled. The imaging device may periodically try to contact the External Authorization server until it is available. Table 1 below describes what entity has control of the UI, in an exemplary embodiment, when the device is in a disabled state.

TABLE 1

UI Control in Disabled State

| Button Press | UI Control | Indicator Lights |
|---|---|---|
| Device boots | External Application | None |
| Document Filing | External Application | None |
| Image Send | External Application | None |
| Copy | External Application | None |
| Job Status | Device—standard Job Status screens | Job Status |
| Custom Settings | Device—standard Custom Settings screens | N/A |
| OS Mode | Not available when device is disabled | |

Remote Computing Device Applications

In embodiments of the present invention, access to the custom UI panels of imaging devices may vary from application to application. Some solutions, such as Document Management integration, may wish to leverage the native Image Send screens, but display some custom UI's to gather additional information about a scan job. Other solutions, like custom printing applications, may be accessed from a separate mode than the native functions.

In order to accommodate the diversified needs of these solutions applications, embodiments may support multiple integration points for UI control. These integration points are based on a user action ("trigger") for which applications may register. In some embodiments, applications may be registered with target devices so that the device knows that when "trigger A" occurs on the front panel to contact "remote computing device B" for instructions. In exemplary embodiments, applications may be integrated with an imaging device at any of several "trigger" points.

Remote computing devices may be registered to a specific function and contacted when that function's hardware key is pressed (e.g. Image Send) on the imaging device UI. Any UI information provided by the remote computing device may be displayed instead of the standard function screens native to the imaging device. This trigger may be used for applications that wish to replace the existing functions with completely custom UI's, such as an alternative scan solution or a specialized display, such as a "Section 508" compatible screen or other specialized-need interface that may have large buttons or other accommodations.

In some embodiments, each function on the imaging device may have a menu on the touch screen that remote computing devices, such as servers, can register. This enables solutions applications to provide custom content and still use some of the standard functionality provided by the imaging device. When a button assigned to a custom application is selected, a menu will be displayed with the solutions registered to that function. Users may select the desired solution and the remote computing device will be contacted for instructions.

In some embodiments, a stand-alone RCD mode that provides remote computing device application access can be accessed from the job queue portion of the UI that is displayed on every screen. This trigger point may be used for applications that do not fit within one of the standard device functions, such as custom printing solutions on an imaging device. When the RCD menu is selected, a menu will be displayed with the solutions applications registered to the generic RCD mode. Users will select the desired solution and the remote computing device will be contacted for instructions.

Hardware Key Interaction

In some embodiments of the present invention, when an imaging device is enabled, additional hardware keys may be used to manage the device. Hardware key assignments for an exemplary embodiment are shown in table 2.

TABLE 2

Exemplary Hardware Key Assignments

| Button Press | Standard IDev Mode | RCD Mode |
|---|---|---|
| Mode keys (Copy, Doc Filing, Image Send) and Custom Settings key | Clear current job settings, move to target screen | Clear current job settings, move to target screen |
| Job Status key | Move to Job Status, maintain current settings &UI location | Move to Job Status, maintain current settings &UI location |
| Clear (C) | Clears settings | Sends clear event to external application |
| Clear All (CA) | Clears settings, cancels job, and returns to default IDev screen | Cancels job and returns to default IDev screen (notification sent to external application) **When External Authorization is controlling the UI, only notification is sent |
| Start | Initiates scan function | Initiates scan function |

TABLE 2-continued

Exemplary Hardware Key Assignments

| Button Press | Standard IDev Mode | RCD Mode |
|---|---|---|
| Number keys | Input for copy count or fax numbers | Not used |
| * | Logs user out (disable device and contact External Authorization for screens) | Logs user out (disable device and contact External Authorization for screens) |

In some embodiments, in addition to the * key for logout, a timeout period may be implemented. Some embodiments also comprise an auto clear setting that can be configured for a given period of time, such as 10 to 240 seconds (or disabled). In these embodiments, when there is no activity for the time configured in auto clear, the device may automatically return to disabled mode and attempt to contact a remote computing device to retake control of the UI.

Error & Jam Notifications

Depending on a particular solution, a remote computing device application may have full or only partial control of the imaging device UI and a particular imaging job. In some embodiments, partial control may include cases where a remote computing device is monitoring clicks, but native modes are responsible for the UI interaction and controlling the job. Partial control may also include cases where the remote computing device application is integrated with a native mode (UI trigger=function custom menu). In these embodiments, the imaging device may handle all error and jam notifications with only a notification sent to the relevant remote computing device application.

For some embodiments, in cases where the remote computing device application has full control over the UI and the job, error and jam notifications may be handled differently depending on the type of error. For recoverable errors, a notification may be sent to the remote computing device application and the application may be responsible for displaying messages and resolving the error. For non-recoverable errors, the imaging device and RCD mode may interact to gracefully handle the error condition (e.g. provide user with instructions for clearing jam).

Control Handoffs

In some embodiments, at different points throughout an imaging job, several applications may need control over an imaging device including, but not limited to, an External Authorization application, a standard RCD application, an imaging device native mode and other applications. The following section describes, for an exemplary embodiment, the various steps in an exemplary job, the entities that may have control during each step, and what type of control may be allowed.

Step 1: User provides credentials to access the device at the device UI. This step may be controlled by a remote computing device, such as an External Authorization application or by Internal Accounting (native mode) in the imaging device itself. At the end of this step, the device is enabled. The External Authorization application may also specify default parameters or disable specific job parameters (e.g. default file format is PDF, but user may change; color mode is set to B/W and user may not change).

Step 2: User sets parameters for the job using one of the native imaging device modes or a standard RCD application. At the end of this step the user makes an input to initiate the job. When the input is made, an optional notification may be sent to the standard RCD application, which can then change job parameters if desired. An e-mail application is one example of an application that may request notification when the user input is made. A user may use native Image Send screens or other input to select scan options and choose e-mail recipients. A user may then select a custom application button and choose the scan-to-e-mail option from the menu. The e-mail application may then display custom screens for the user to set permissions for the file. Once a user places the original document(s) on the scanner and initiates the process, the e-mail application may capture the destination parameters set by the user and change the target destination to the e-mail application FTP server. The e-mail application may then receive the file, apply the appropriate permissions, and send to the e-mail recipients selected by the user. A remote computing device application may also want to retake control of the UI at this point, if, as in some embodiments, the application generates thumbnails of the scanned images and displays them to the user for verification.

Step 3: Once the job is initiated, the imaging device is responsible for scanning or RIPing the job and spooling it to the HDD. If the imaging device is configured to authorize jobs with an external authorization application, it may send a click report to the application and wait for instructions. The external authorization application may enable the job for sending/printing, cancel the job, or change job parameters (and then enable). As an example, a rules-based printing application may wish to change job parameters after it receives a click report. Some rules-based printing applications support rules-based printing and scanning that can limit what each user is allowed to do based on the time of day, the destination, or many other parameters. For example, only users in the marketing group may be able to scan high-quality color images. If a user from another group selects color and 600 dpi, a rules-based application may change the parameters to color and 200 dpi. At the end of this step the job should either be authorized or canceled.

Step 4: In some embodiments, this may be an optional step, where the standard RCD application in step 2 may have specified the destination as a HDD for temporary storage. This step may also be used, in some embodiments, by a Java application running on the imaging device. For example, a government office may have a custom encryption application running on the device that takes the scanned document, encrypts it, and then requests the imaging device to send it to the target destination selected by the user in step 2. In some embodiments, it may be beneficial to send a notification to the external authorization application after this step—because the imaging device does not know how long the file will be on the HDD or what the application is going to do with it—and after the send/print step.

Step 5: In the final step, the file is actually output. In typical embodiments, the file is either sent over the network or printed locally. At the end of this step, a notification that the job was successfully completed should be sent to the external authorization application and optionally, to the standard RCD application.

Device Control and Management API's

The API's may be used to allow a remote computing device application to control access to an imaging device for vend applications and to manage the device from a remote location.

Device Control and Vend API

In some embodiments of the present invention, a Device Control and Vend API allows applications to enable and disable access to the device and track click counts. The Device Control and Vend API may provide an RCD with the following controls:

Enable/disable device of function—this may allow an RCD to enable or disable access to the device as a whole or by function to enforce individual user privileges. In some exemplary embodiments, the functions listed in Table 3 may be selectively enabled or disabled by an application.

TABLE 3

Device Functions

| Enable/Disable | Description |
|---|---|
| Copy | Copy function (Copy button) |
| Image Send | Scan and fax function, plus send from Doc Filing (Image Send button) |
| Document Filing | All access to Document Filing functions (Document Filing button) |
| Print | Network prints, pull print from front panel, and print from Document Filing (No button control) |

Report clicks used—at the end of a successful job, the clicks used may be reported back to an RCD including:

TABLE 4

Job and Page Characteristics

| Item | Copy | Print | Fax Send | PC-Fax | E-mail/FTP | Broadcast | Scan to HD |
|---|---|---|---|---|---|---|---|
| *JOB Characteristics* | | | | | | | |
| Job Mode | Yes | Yes | Yes | Yes | Yes | Yes | Yes |
| Broadcast Manage No. | No | No | Yes | Yes | Yes | Yes | No |
| User Name | Yes | Yes | Yes | Yes | Yes | Yes | Yes |
| Address | No | No | Yes | Yes | Yes | # | No |
| Start Time | Yes | Yes | Yes | Yes | Yes | Yes | Yes |
| End Time | Yes | Yes | Yes | Yes | Yes | Yes | Yes |
| Total Page | Yes | Yes | Yes | Yes | Yes | Yes | Yes |
| Result | Yes | Yes | Yes | Yes | Yes | Yes | Yes |
| Error Cause | No | No | Yes | Yes | Yes | Yes | No |
| Doc Filing | Yes | Yes | Yes | Yes | Yes | Yes | Yes |
| Save Mode | *1 | *1 | *1 | *1 | *1 | *1 | *1 |
| File Name | *1 | Yes | *1 | Yes | Yes | *1 | Yes |
| File Size | Yes | Yes | *1 | *1 | *1 | *1 | Yes |
| Resolution | Yes | Yes | Yes | Yes | Yes | Yes | Yes |
| Special | Yes | Yes | Yes | No | Yes | Yes | Yes |
| Finishing | Yes | Yes | No | No | No | No | No |
| File Format | No | No | No | No | Yes | Yes | No |
| Compression | No | No | No | No | Yes | Yes | No |
| *PAGE Characteristics* | | | | | | | |
| Copy | Yes | Yes | Yes | Yes | Yes | # | Yes |
| Paper Size | Yes | Yes | Yes | Yes | Yes | Yes | Yes |
| Simplex/duplex | Yes | Yes | Yes | Yes | Yes | Yes | Yes |
| Paper Type | Yes | Yes | Yes | Yes | No | No | Yes |
| Page | Yes | Yes | Yes | Yes | Yes | Yes | Yes |

*1—Yes when Document Filing is used

Debit mode—in these embodiments, when an application enables the device it may specify if the current job requires authorization. If so, the job will be spooled to memory and click information (e.g., as defined in Table 4) will be sent to an RCD. An RCD will then notify the device if the job should be deleted or output/sent. At this point, the application also has the option of changing job parameters. If the application does not require authorization, the job will continue as normal and a click report will be sent at the end of the job.

Print job accounting—in these embodiments, an RCD may wish to monitor print jobs along with walk-up functions. For print job accounting, an IDev may monitor all incoming print jobs and send accounting data in the PJL header to an RCD for verification before printing the job. The RCD will evaluate the accounting data (or lack thereof) and inform the IDev to continue with or cancel the job.

Report on unidentified jobs—in these embodiments, an RCD may also wish to monitor print jobs that it cannot associate to a specific user, such as device reports and incoming fax jobs. The RCD can register to receive click counts for all unidentified jobs, so that it may bill them to a general account.

Device Management API

In some embodiments of the present invention, a Device Management API allows a network application to remotely setup and manage the imaging device. In exemplary embodiments, the Device Management API may provide an RCD with the following controls:

Device status—an RCD may request the current status of the device. This is the same status information as reported on the embedded web pages.

Device configuration—an RCD can retrieve a list of installed options supported by the device.

Web Page settings—an RCD application can retrieve and set any of the values that are configurable on the embedded web pages.

Key Operator Programs—an RCD application can retrieve and set any of the values that are configurable in Key Operator Programs, including software keys.

Custom Settings—an RCD application can retrieve and set any of the values that are configurable in Custom Settings.

Job Status—an RCD application can retrieve the current job queue and history information and reprioritize or delete jobs in the queue.

Click counts—an RCD application can retrieve device total counts and clicks for each function by account code.

Data Security settings—an RCD application may retrieve the status information on the DSK (e.g. last erase) and initiate data clear functions.

RED data—an RCD can retrieve all data typically sent in a RED message.

Remote reboot—an RCD can initiate a reboot of the imaging device.

The above groupings are provided only as an exemplary embodiment detailing which settings should be included. In some embodiments, actual API's should be grouped by functional areas since there may be overlap between Key Operator settings and web page settings.

Internal Accounting API

In some embodiments, an Internal Accounting API may allow a remote computing device application to configure internal accounting and report click counts. In some exemplary embodiments an Internal Accounting API may include:

Set Auditing Options—an RCD may set auditing options including which modes auditing is enabled for, "account number security", and "cancel jobs of invalid accounts."

Manage Account Codes—an RCD can add, edit, or delete account codes

Account Limits—an RCD application can specify a maximum number of clicks by function for individual account codes or for all account codes Account Reset—an RCD application can reset the click count for an individual account or for all accounts Retrieve Clicks—an RCD can retrieve the number of clicks by function for each account code Font and Form Management API Some embodiments of the present invention may comprise a Font and Form 10 Management API, which allows an RCD application to remotely download and manage fonts and forms in mass-storage. In some exemplary embodiments, a Font and Form Management API may provide a remote computing device with the following controls:

- Mass storage control—an RCD application can retrieve mass storage status information including storage capacity, space available, and write-protect mode plus modify write-protect status.
- Resource list—an RCD application can retrieve a list of stored fonts and forms including font or macro ID, font number, font/form name, escape sequence, and file size.
- Download resource—an RCD application can download PCL fonts, PCL macros, and PS fonts and forms. Any special processing that is performed when a resource is downloaded via the web pages will also be performed when the resource is downloaded via Open Systems.
- Delete resource—an RCD application can delete any resource stored in mass storage.
- Upload resources—an RCD application can upload an individual or all resources. On devices where effective memory management is unavailable, a server application can use this function to "defrag" mass storage.
- Font/macro ID's—an RCD application can assign or modify the ID's assigned to PCL fonts and macros.

Firmware Management API

In some embodiments of the present invention, a Firmware Management API may allow a remote computing device or network application to remotely download and manage the imaging device firmware. In some exemplary embodiments, a Firmware Management API may provide a remote computing device (e.g., a server) with the following controls:

- Firmware versions—an RCD application can retrieve the current firmware version numbers.
- Service mode—an RCD application can place the MFP in service mode to lockout other jobs that will interfere with firmware upgrade. Upon receiving a service mode request, the IDev will stop accepting incoming jobs, complete all jobs in the queue, and then notify the server that it is in service mode.
- Update firmware—an RCD can download an updated firmware version to the device. If a reboot is necessary, the IDev will perform it automatically when download is complete.
- Download status—the IDev will send a status notification (success/error) to an RCD after firmware download.
- Revert to previous version—if firmware update is not successful, the application can request the IDev to revert to the previous firmware version.

Device Function API's

In some embodiments of the present invention, device function API's allow a remote computing device application to use existing imaging device functionality to provide new custom solutions.

Image Send API

In some embodiments, an Image Send API may provide the remote computing device application with the following controls:

- Image Send Parameters—a remote computing device application can get and set values for the following scan and fax parameters:
  COLOR OR B/W
  IMAGE MODE—TEXT, TEXT/PHOTO, PHOTO; EXPOSURE LEVEL
  RESOLUTION
  FILE FORMAT—FILE TYPE, COMPRESSION, AND PAGES PER FILE
  ORIGINAL—ORIGINAL SIZE, SIMPLEX/DUPLEX, ROTATE, AND JOB BUILD
  FILENAME
  SUBJECT
  MESSAGE
  SENDER
  SCHEDULE SEND TIME
  PAGE DIVISION (BOOK SCANNING)
  COVER PAGE
  TRANSMISSION MESSAGE (CONFIDENTIAL, URGENT, ETC.)
  THIN PAPER SCANNING
  DESTINATION
  DOCUMENT FILING
- Initiate Scan—the remote computing device application can initiate the scan function (same as user pressing start button).

In some embodiments, a remote computing device can change the default values on the imaging device or the values for the current job. For the current job, the remote computing device may also specify if scan parameters may be modified by the user or not. If one remote computing device application (e.g. Access Control) specifies that a parameter cannot be changed and then a second application (e.g. Document Management) tries to set the parameter, a notification may be sent to the second application and the setting will not be changed.

Print API

In some embodiments, print jobs may be submitted by remote computing device applications using standard printing channels. In some exemplary embodiments, a Print API may provide a remote computing device with the following additional control:

- PJL sniffing—an RCD application can register with the IDev to be contacted for instructions when a specific PJL command is found in a print job. The RCD can then instruct the IDev to replace the command, cancel the job, or continue printing. This interface may be used in applications like accounting and other-brand compatibility.

Copy API

In some embodiments of the present invention, a Copy API may provide a remote computing device with the following exemplary controls:

- Copy Parameters—an RCD application can get and set values for the following copy parameters:
  COLOR OR B/W
  EXPOSURE—TEXT, TEXT/PHOTO, PHOTO, SUPER PHOTO; EXPOSURE LEVEL
  PAPER SELECT (BY TRAY)
  COPY RATIO
  2-SIDED COPY—1TO1, 1TO2, 2TO2, 2TO1; BINDING EDGE
  OUTPUT—OUTPUT TRAY, SORT, STAPLE, GROUP, OFFSET
  ORIGINAL SIZE
  SPECIAL FUNCTIONS—MARGIN SHIFT, ERASE, PAMPHLET, ETC.
  DOCUMENT FILING
- Initiate Copy—an RCD application can initiate the copy function (same as user pressing start button).

In some embodiments, a remote computing device can change the default values on the imaging device or the values for the current job. For the current job, the remote computing device may also specify if copy parameters may be modified by the user or not.

Document Filing API

In some embodiments of the present invention, a Document Filing API may provide a remote computing device with the following exemplary controls:

- Backup/restore—the remote computing device application can import and export a batch file with all Document Filing data. In some embodiments, this package will be in a proprietary format since it contains documents that are password-protected and should not be accessed individually—this is typically for restore in case of failure or cloning to other devices.

File/folder list—the remote computing device application can retrieve, modify, and create new files and folders to be stored on the IDev (also covered in device management).

Download file—the remote computing device can download a new file to the Document Filing systems and specify folder, filename, username, and password.

User list—the remote computing device application can retrieve, modify, and create new users to be stored on the IDev (also covered in device management).

HDD Status—the remote computing device application can retrieve the current HDD status including the % allocated to the main folder, quick folder, and custom folders and the % remaining.

Doc Filing Parameters—the remote computing device application can get and set values for storing a file to Doc Filing including:
EXPOSURE
RESOLUTION
ORIGINAL—SIZE, SIMPLEX/DUPLEX
FILE INFORMATION—USERNAME, FILENAME, FOLDER, CONFIDENTIAL, PASSWORD
SPECIAL MODES—ERASE, DUAL PAGE COPY, 2IN1, JOB BUILD, CARD SHOT Initiate Print—the remote computing device application can select a stored file and initiate a print including the following parameters:
PAPER SIZE/SOURCE
OUTPUT—SORT/GROUP, OUTPUT TRAY, STAPLE, PUNCH, OFFSET
SIMPLEX/DUPLEX (TABLET/BOOKLET)
TANDEM PRINT
NUMBER OF COPIES
DELETE OR STORE AFTER PRINTING Initiate Send—the remote computing device application can select a stored file and initiate a send including the following parameters:
RESOLUTION
FILE FORMAT
DESTINATION
TIMER
SENDER
FILENAME
SUBJECT
MESSAGE Secuirty Allowing external applications to control an imaging device opens up the imaging device to new security vulnerabilities. In embodiments of the present invention that provide some security measures, the following exemplary items are security concerns that may be addressed by the remote computing device interface.

Access to remote computing device interfaces may be limited to valid applications. Embodiments provide extensive access and control of the imaging device, which poses a significant security risk. The interface of these embodiments may be protected from access by attackers, while maintaining ease of setup and use for valid solutions.

Confidential data (user credentials and job data) may be protected during network transfer. User credentials and job data may be secured during network transfer to ensure that it cannot be stolen, an intruder cannot monitor device activity, and a man-in-the-middle attack cannot change messages. Imaging devices may support Secure Sockets Layer (SSL) and other connections to ensure data is safe while being communicated between the imaging device and remote computing device applications.

Administrators may have the ability to lock-down imaging device access. For users with strict security policies, administrators may have the ability to disable access by remote computing devices or limit access to specific applications. Administrators may have an option to register the limited applications that they wish to access the imaging device interfaces.

Remote computing device applications may ensure the imaging device is not being "spoofed." The remote computing device may be able to authenticate an imaging device that it is contract with it to ensure an intruder cannot imitate the imaging device to collect network configuration and password information, monitor file/folder structures of a document management system, or spoof security settings and DSK status of the imaging device.

A remote computing device may ensure that the server is not being "spoofed." The imaging device must be able to authenticate all remote computing devices that it is in contact with to ensure that an intruder is not spoofing the remote computing device's IP address. By pretending to be the remote computing device, an intruder could steal user credentials, redirect scanned documents, change device settings or firmware, or bring down the access control system (either to provide access to unauthorized users or initiate a denial of service attack for valid users).

Access control/vend applications may not be compromised when a remote computing device is unavailable. When the remote computing device is unavailable, it may not be acceptable to provide open access to the device. If the remote computing device is unavailable at startup or becomes unavailable at anytime (e.g. someone disconnects network cable), the imaging device may immediately be disabled and an error message displayed.

An administrator may be able to adjust a security level based on company and application requirements. Security requirements can have a large impact on the time it takes to develop a remote computing device application and the resources required to implement the solution. Users using some embodiments may range from a small business with one imaging device, no IT staff, and a simple scan or print application to a large government office using access control and audit trails to track all device activity. The security measures used to protect imaging device interfaces may be adjustable by-the administrator to match the target environment.

The imaging device and remote computing device applications may be able to hand-off user credentials. Users may be prompted to login at multiple points throughout a job. For example, an access control application or accounting application may control total device access, the imaging device may have user authentication enabled for Image Send, and a document management application may require user login before showing a folder list. In many environments, all of these applications will use a common user database. In some embodiments, it is, therefore, desirable for the applications to pass user credentials to each other, so that each one does not have to repeat the authentication process.

Some embodiments of the present invention may be described with reference to FIG. 3. These embodiments comprise an imaging device only, which is configured to interact with a remote computing device, such as a server through a communications link. The imaging device 30 comprises a user interface 32, which comprises a user input device 34, such as a keypad, one or more buttons, knobs or switches or a touch-screen panel and a display 36, which may comprise user input device 34 in the form of a touch-screen panel.

Imaging device 30 will typically be capable of performing one or more imaging functions including, but not limited to, scanning, printing, copying, facsimile transmission (sending and receiving) and others.

Figure 3:
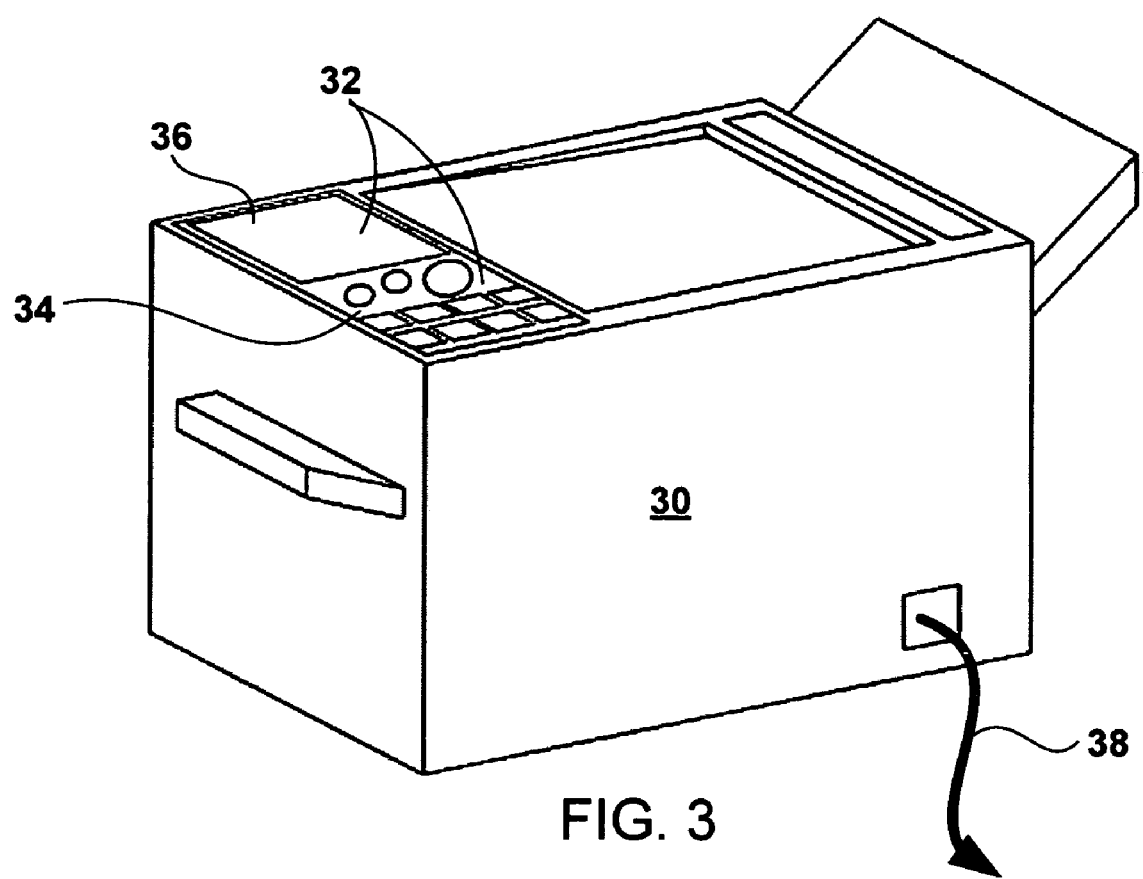
FIG. 3 shows an exemplary imaging device.

These embodiments further comprise a communications link 38, which may be a wired connection (as shown in FIG. 3) comprising a network cable, a Universal Serial Bus (USB) cable, a serial cable, a parallel cable, a powerline communication connection such as a HomePlug connection or other wired connections. Alternatively, the communications link 38 may comprise a wireless connection, such as an IEEE 802.11 (b) compliant connection, a Bluetooth connection, an Infrared Data Association (IrDA) connection or some other wireless connection.

Figure 4:
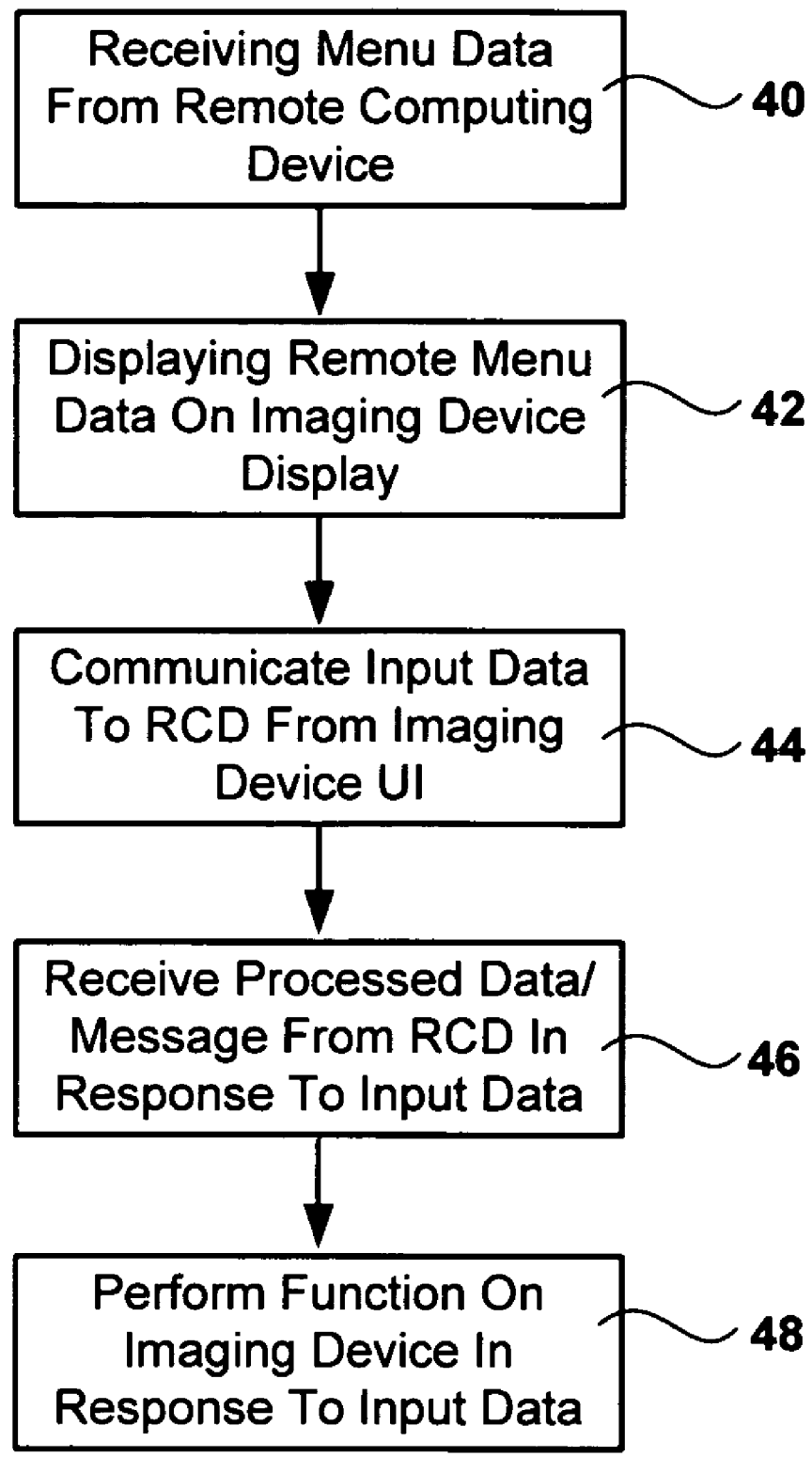
FIG. 4 is a chart depicting steps of an imaging device method.

The operation of some imaging device embodiments may be explained with reference to FIG. 4. In these embodiments, menu data is received 40 from a remote computing device (not shown in FIG. 3), which is connected to the imaging device 30 via the communication link 38 through a wired or wireless connection. This menu data is then displayed 42 on the imaging device user interface display 36. This display of remote menu data is intended to prompt a user to make an input on the user interface input device 34.

Imaging devices of these embodiments are further configured to accept input from a user in response to a display of remote menu data and communicate 44 that user input to a remote computing device. In some embodiments, this user input data will be processed by a remote computing device. This may comprise running an application on the remote computing device. This processing may also comprise accessing and communicating data that is stored on the remote computing device.

The imaging devices of these embodiments are further configured to receive 46 data resulting from processing the user input data. This may comprise data generated by an application running on the remote computing device in response to the user input. The imaging device may also receive data that was stored on a remote computing device, such as a file server, in response to processing the user input.

Once the imaging device 30 has received 46 the processed data, the imaging device 30 may perform 48 a native function in response to the data or using the data. For example, and not be way of limitation, the imaging device 30 may print a document that was stored on the remote computing device and modified on the remote computing device according to the user input. As another non-limiting example, the imaging device 30 may active or enable functions (i.e., scanning, copying, printing, fax transmission) on the imaging device in response to the receipt 46 of processed data.

Figure 5:
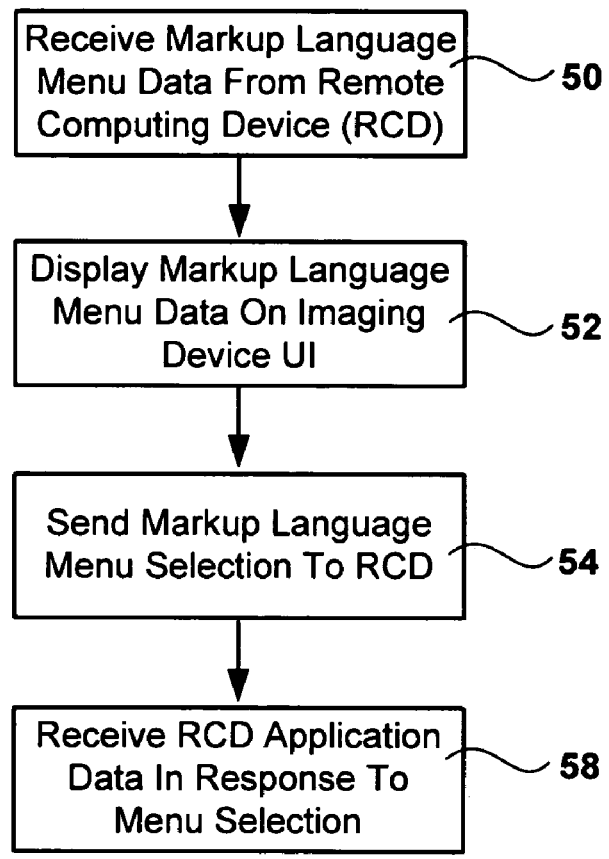
FIG. 5 is a chart depicting steps of an imaging device method using a markup language.

Some, more specific, imaging device embodiments may be explained with reference to FIG. 5. In these embodiments, the imaging device 30 is configured to receive 50 menu data formatted in a markup language from a remote computing device. The communication link by which the menu data is communicated may be established and maintained using a Hypertext Transfer Protocol (HTTP). The markup language may comprise terms from Hypertext Markup Language (HTML), Extensible Markup Language (XML), Wireless Markup Language (WML), Extensible Hypertext Markup Language (XHTML) and/or other languages.

Once the menu data is received 50, it may be displayed 52 on the imaging device user interface display 36. As in previously described embodiments, the menu data is typically intended to prompt user input on imaging device user interface 32. Display 52 of the remotely-stored menu data may be accomplished with a browser application that is native to the imaging device 30.

In these embodiments, the imaging device 30 is further configured to route 54 user input received through its user interface 32 to a remote computing device. The remote computing device that receives the user input may then run an application or otherwise process the user input and return the results of the processing to the imaging device 30. Accordingly, the imaging device 30 is further configured to receive 56 processed data from a remote computing device. In some embodiments, the imaging device 30 may perform one or more functions in response to the receipt 56 of processed data.

Figure 6:
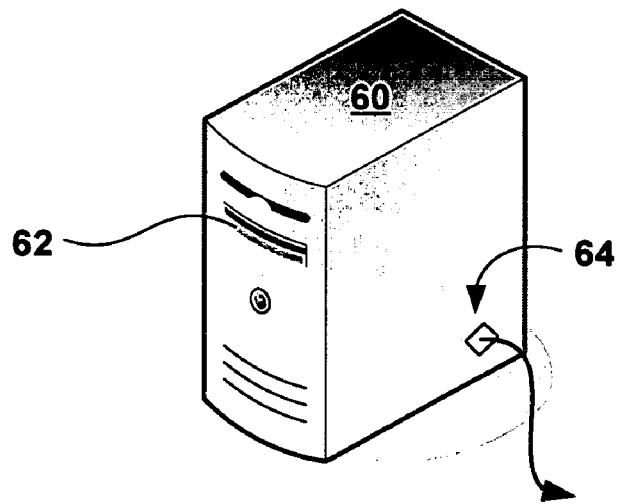
FIG. 6 shows an exemplary remote computing device embodiment.

Some embodiments of the present invention may be explained with reference to FIG. 6. These embodiments comprise a remote computing device (RCD) 60, which has a communications link 64. Communications link 64 may be a wired connection (as shown in FIG. 6) comprising a network cable, a Universal Serial Bus (USB) cable, a serial cable, a parallel cable, a powerline communication connection such as a HomePlug connection or other wired connections. Alternatively, the communications link 64 may comprise a wireless connection, such as an IEEE 802.11(b) compliant connection, a Bluetooth connection, an Infrared connection, such as those defined in the Infrared Data Association (IrDA) standard or some other wireless connection. In some embodiments, RCD 60 may further comprise a data storage device 62, which is typically a hard drive, but may also be an optical drive device, such as an array of compact disk drives, flash memory or some other storage device.

Figure 7:
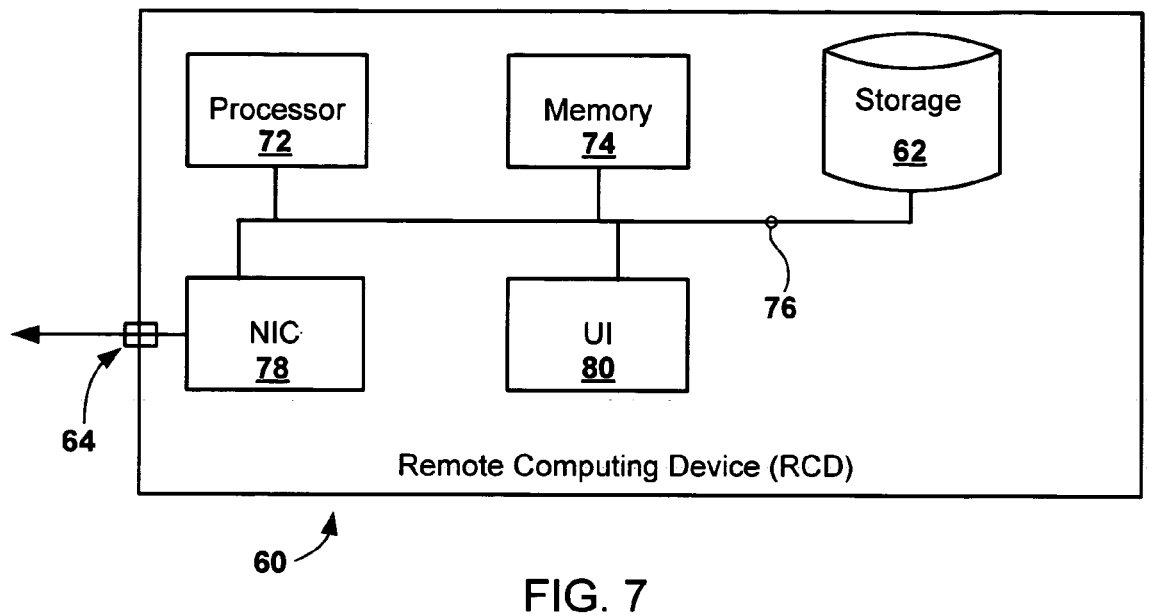
FIG. 7 is a diagram showing components of an exemplary remote computing device.

Embodiments of RCD 60 may be further described with reference to FIG. 7. In these embodiments, RCD 60 comprises a processor 72 for processing data and running programs such as operating systems and applications. RCD 60 may further comprise memory 74, which may be in the form of Random Access Memory (RAM) and Read Only Memory (ROM). Generally, any applications processed by processor 72 will be loaded into memory 74. RCD 60 may further comprise a network interface 78, which allows RCD 60 to communicate with other devices, such as an imaging device 30. In some, embodiments, RCD 60 may also comprise a user interface 80, but this is not required in many embodiments. Storage 62 may be used to store applications and data that may be accessed by an imaging device 30 of embodiments of the present invention. Processor 72, memory 74, storage 62, network interface 78 and, optionally, user interface 80 are typically linked by a system bus 76 to enable data transfer between each component. Communications link 64 may couple the RCD 60 to other devices via network interface 78.

Figure 8:
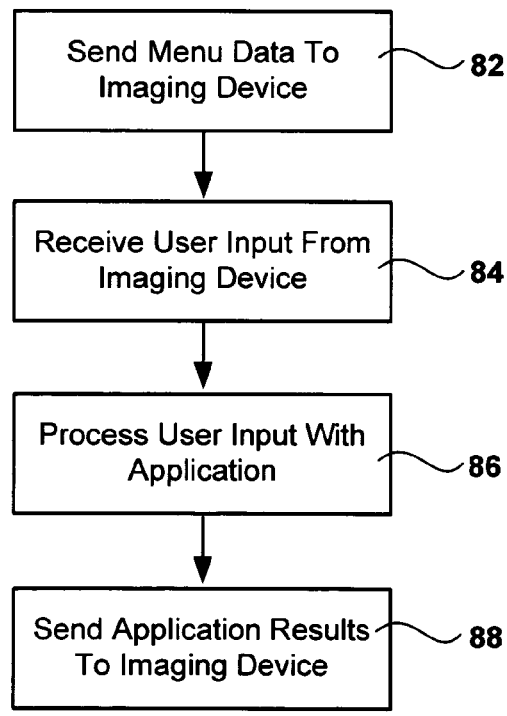
FIG. 8 is a chart showing steps of a remote computing device method.

In some embodiments, described with reference to FIG. 8, an RCD 60 may comprise menu data stored on storage device 62 or in memory 74. This menu data may be configured for display on an imaging device user interface 32. Menu data may be stored in many formats and configurations. In some embodiments menu data may take the form of terms expressed with a markup language. The markup language may comprise terms from Hypertext Markup Language (HTML), Extensible Markup Language (XML), Wireless Markup Language (WML), Extensible Hypertext Markup Language (XHTML) and/or other languages. In these embodiments, menu data may be sent 82 through a communications link 64 to an imaging device 30. Accordingly, menu data configured for display on an imaging device is stored on RCD 60.

An RCD 60, of some embodiments, will be further configured to receive 84 user input obtained through the user interface 32 of an imaging device 30 and transferred to the RCD 60 over communications links 38 & 64. Once this input data is received at an RCD 60, the input data may be processed 86. This processing 86 may comprise conversion of the data to a new format, execution of commands contained within the data or some other process. Once the input data has been processed 86, the processed output may be sent 88 back to the imaging device 30 where the processed output may be used in an imaging device process or function.

Figure 9:
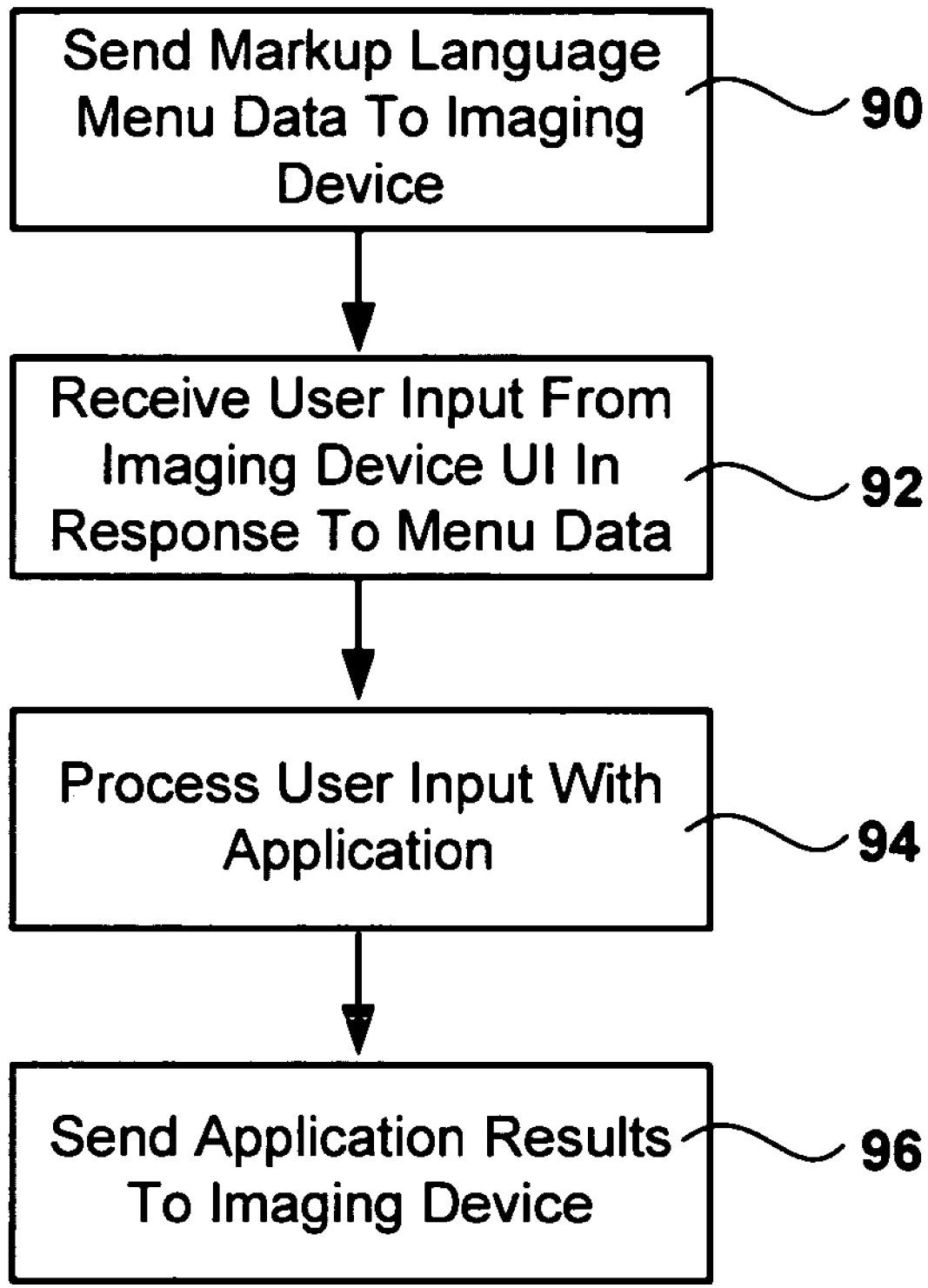
FIG. 9 is a chart showing steps of a remote computing device method using a markup language.

In some embodiments, as described with reference to FIG. 9, an RCD 60 may send 90 menu data configured for an imaging device display 36 using a markup language. The markup language menu data is then received at the imaging device 30 and displayed to a user. Typically, this will prompt the user to enter an input on the imaging device user interface 32. This user input will then be sent by the imaging device 30 to the RCD 60. The RCD 60 will then receive 92 the input data prompted by the display of the menu data on the imaging device 30. Once received, the input data may be processed 94 on the RCD 60. Processing may comprise the selection, recordation and/or modification of a form, document or other data stored on RCD 60, the authorization of a user identified by the user input, the translation of a document input by the user, generation of a map or other directions related to user input or some other process or function.

Figure 10:
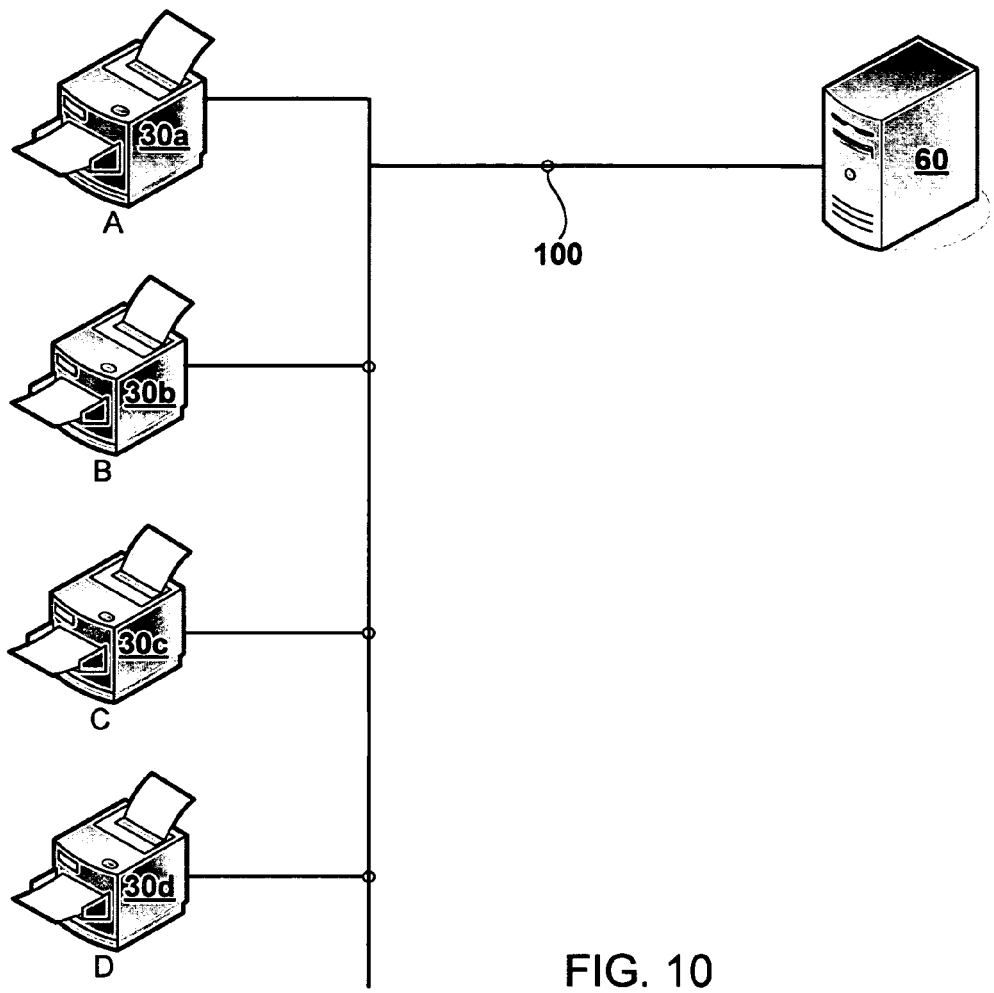
FIG. 10 is a diagram showing a system comprising multiple imaging devices in connection with a remote computing device.
Figure 11:
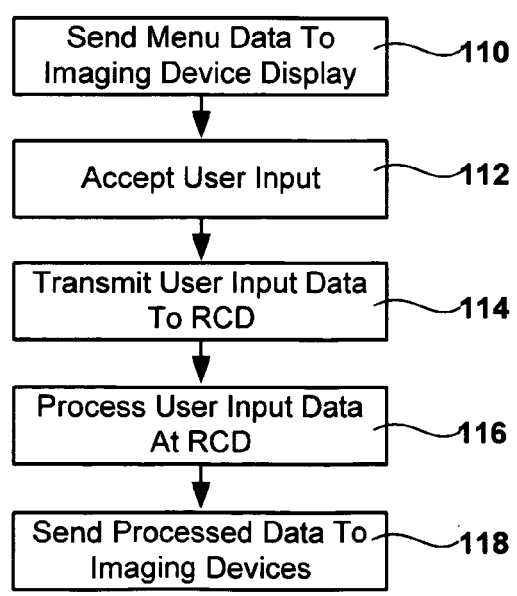
FIG. 11 is a chart showing steps of a method comprising RCD processing of user input data.

Some embodiments of the present invention may be described with reference to FIGS. 10 & 11. These embodiments comprise at least one RCD 60 and a plurality of imaging devices 30*a*-30*d*. In these embodiments, at least one of the imaging devices 30*a*-30*d* comprises a user interface 32 with a display 36 and user input panel 34 that is integral with the display (i.e., touch-screen) or a separate input unit. RCD 60 is connected to imaging devices 30*a*-30*d* by a communications link and network 100 to enable data transmission between RCD 60 and imaging devices 30*a*-30*d*.

In these embodiments, menu data is stored on RCD 60 and sent 110 to at least one of the imaging devices 30*a*-30*d* where the menu data is displayed on a user interface. Any of Imaging devices 30*a*-30*d* that receive the menu data are configured to accept 112 and transmit 114 user input to an RCD 60. Once the user input data is received at the RCD, the data may be processed 116 as discussed in previously described embodiments. The result of processing 116 may then be sent 118 back to any combination of the imaging devices 30*a*-30*d*.

In these embodiments, a single RCD 60 may be used to provide processing power, resources and functionality to a plurality of imaging devices 30*a*-30*d* without reproducing these resources in each imaging device. In some embodiments, data generated by input on one imaging device 30*a* may be directed to another imaging device 30*d* for processed data output or final processing.

Figure 12:
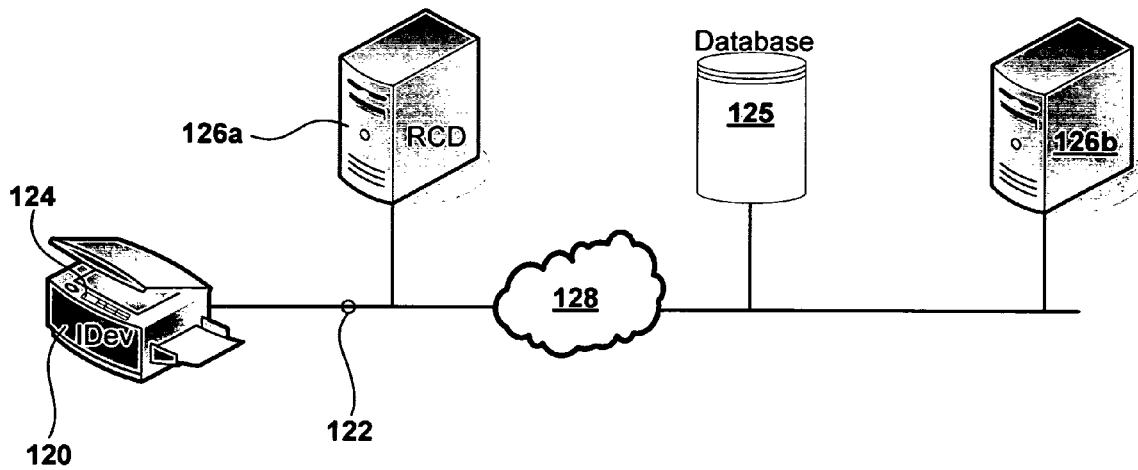
FIG. 12 is a diagram showing components of some embodiments comprising linked resources.

Some embodiments of the present invention may be described with reference to FIG. 12. In these embodiments, an imaging device (IDev) 120 comprises a user interface 124, which is capable of receiving user input and displaying data to a user. The user interface 124 will typically comprise a display, often in the form of a touch panel. The display may be used to display data to a user. This data may comprise menu data to prompt for a user selection or data entry, such as a user ID and password, form selection or some other input. The imaging device 120 has a communication link 122, which may comprise a typical computer network connection, a serial cable or some other wired or wireless communication link as described in other embodiments. The communication link 122 may connect the imaging device 120 to a remote computing device (RCD) 126*a*, 126*b*, such as a server. The RCD 126*a*, 126*b* may be used to store documents, such as forms, and other data and make that data accessible from the imaging device 120. The RCD 126*a*, 126*b* may also execute applications that interact with or receive input from the imaging device 120 and its user interface 124. In some embodiments, a database 125 may be linked to the imaging device 120 and/or an RCD 126*a*, 126*b*. In some embodiments, an RCD 126*b* or database 125 may be connected to an IDev 120 over a wide area network such as the internet 128.

Configuration-Based Accounting Embodiments

Some embodiments of the present invention comprise imaging job configuration capabilities that define elements of an imaging job. A typical multi-function peripheral (MFP) imaging device has the capability to scan, print, fax and copy documents. Some MFPs may also have e-mail functions as well. Many MFPs allow a job to be configured in great-detail. Scan or copy jobs may allow a user to zoom or magnify an image, crop the image, sharpen the image, modify color characteristics and select many other features. Print and copy jobs may allow a user to select color options, darkness levels, N-Up formatting, paper size and many other features. Imaging jobs may be configured to comprise many functions and elements.

Generally, an imaging job can be broken down into elemental functions and processes that are accomplished by different parts of the imaging device. For example, a simple copy job can be broken down into a scan process and a print process. More complex copy jobs may comprise zooming, cropping, rotating, sharpening, page formatting and other elemental functions. These elemental functions and their attributes may be referred to as detailed job parameters. Detailed job parameters comprise media type, media size, media quantity, quantity of impressions per page, pixel count data, image resolution, finishing operations, stapling requirements, punching requirements, collating requirements, color attributes, color depth, color quantity, ink consumption, toner consumption, contrast media consumption, monochrome attributes, grey-scale attributes, double-sided characteristics, single-sided characteristics, N-Up formatting, paper tray selection, scan destination, print destination, power consumption, job type (i.e., print, copy, scan, facsimile, and document management) and many other parameters.

In known imaging systems for commercial applications, fees may be charged for the use of the system. Typically, these fees are based on higher-level system functions. For example, a fixed fee may be charged for each copy of a document page or for each page of a scan job. Known systems lack the ability to determine detailed job parameters and calculate a cost based on those parameters. A system with the ability to determine detailed job parameters and use them in fee calculations can more accurately track system costs and ensure that the system is operating profitably.

Some embodiments of the present invention may comprise a stand-alone imaging device (IDev) with internal processing capabilities. Other embodiments may comprise an imaging device (IDev) in communication with one or more remote computing devices (RCDs).

Figure 13:
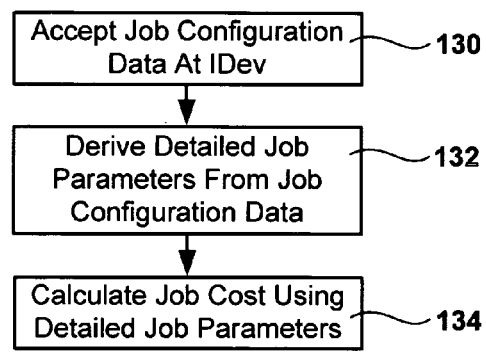
FIG. 13 is a chart showing the steps of a method executed by some stand-alone IDev embodiments.

Some embodiments of the present invention may be described in relation to FIG. 13. In these embodiments, a user may configure an imaging job through input on an imaging device user interface. This configuration data is accepted 130 by the imaging device. The IDev may then derive 132 detailed job parameters from the job configuration data. These detailed job parameters may then be used to calculate 134 job costs or fees, which may be charged to the user.

Some embodiments of the present invention may be described with reference to FIG. 14. In these embodiments, an IDev UI is configured to accept job configuration data.

Prompts may be displayed to a user from a UI display device to indicate configuration options. Prompts may take the form of active display content that is displayed to a user, passive text or graphics on the input device or some other form of prompt. Once a user is prompted 140 to configure an imaging job, the configuration data input by the user may be accepted 142 at the IDev for further processing. In these embodiments, the IDev may derive 144 detailed job parameters from the job configuration data. Job costs and/or user fees may then be calculated 146 by the IDev using these detailed job parameters. In some embodiments, an account verification process may be employed whereby the fees for the current job are compared to a user's account to verify that there is sufficient account capacity. Account capacity may represent an amount of funds available in a debit account, an amount of credit available on a credit account or some other metric in an accounting system. If the calculated job costs/fees meet account restrictions, a job may be approved 147 by the accounting system and executed 149 by the imaging device. If the calculated job costs/fees do not meet account restrictions 147, the job will be denied 148 and the user will not be allowed to execute the job.

Figure 14:
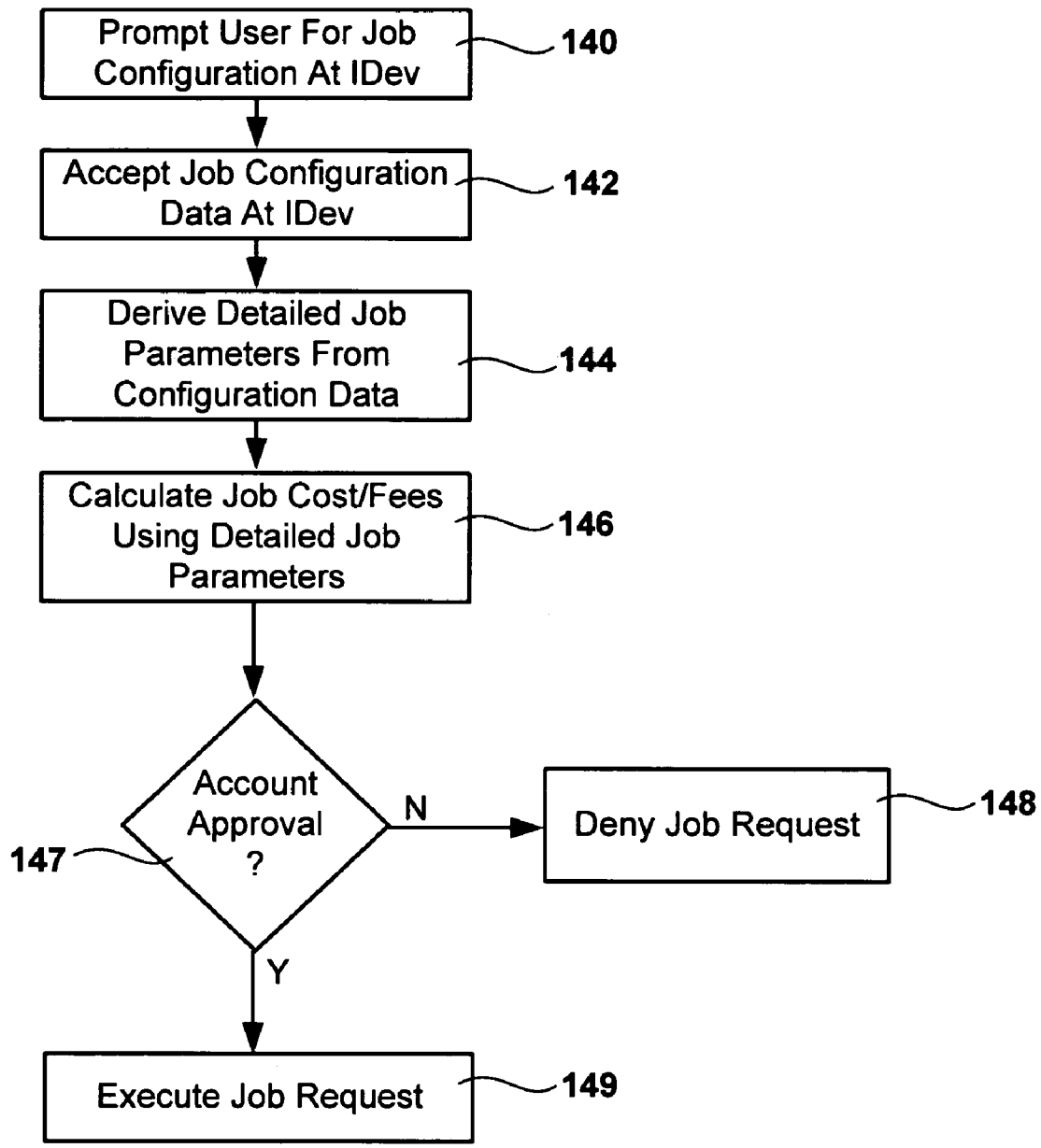
FIG. 14 is a chart showing the steps of a method executed by some stand-alone IDev embodiments comprising accounting authorization.

In an exemplary embodiment, related to those depicted in FIG. 14, a user may read prompts 140 in the form of text and graphics displayed on an imaging device UI display. In response to these prompts, the user may input job configuration data using the IDev UI. For example, a user may select a high-resolution, color, copy function that blows up the image (increase size) by 100% and applies a filter to sharpen the image finally printing the image on photographic media paper. This input is accepted 142 by the IDev and stored for processing. The IDev may then process this job configuration data and derive 144 detailed job parameters from the data. These detailed job parameters may comprise high-resolution processing, color toner consumption, final media size, media type and other parameters related to the imaging job. A cost or fee may be associated with each of these parameters and a total fee may be calculated 146 for the job as configured by the user. In a debit account scenario, the user's account may be checked to verify that finds have been deposited to cover the cost of the imaging job. If the account has sufficient funds, the job will be approved 147 and the imaging device will proceed with execution 149 of the job as configured. If the account does not have sufficient funds, the job will be denied 148 and will not be allowed to execute on the imaging device.

Figure 15:
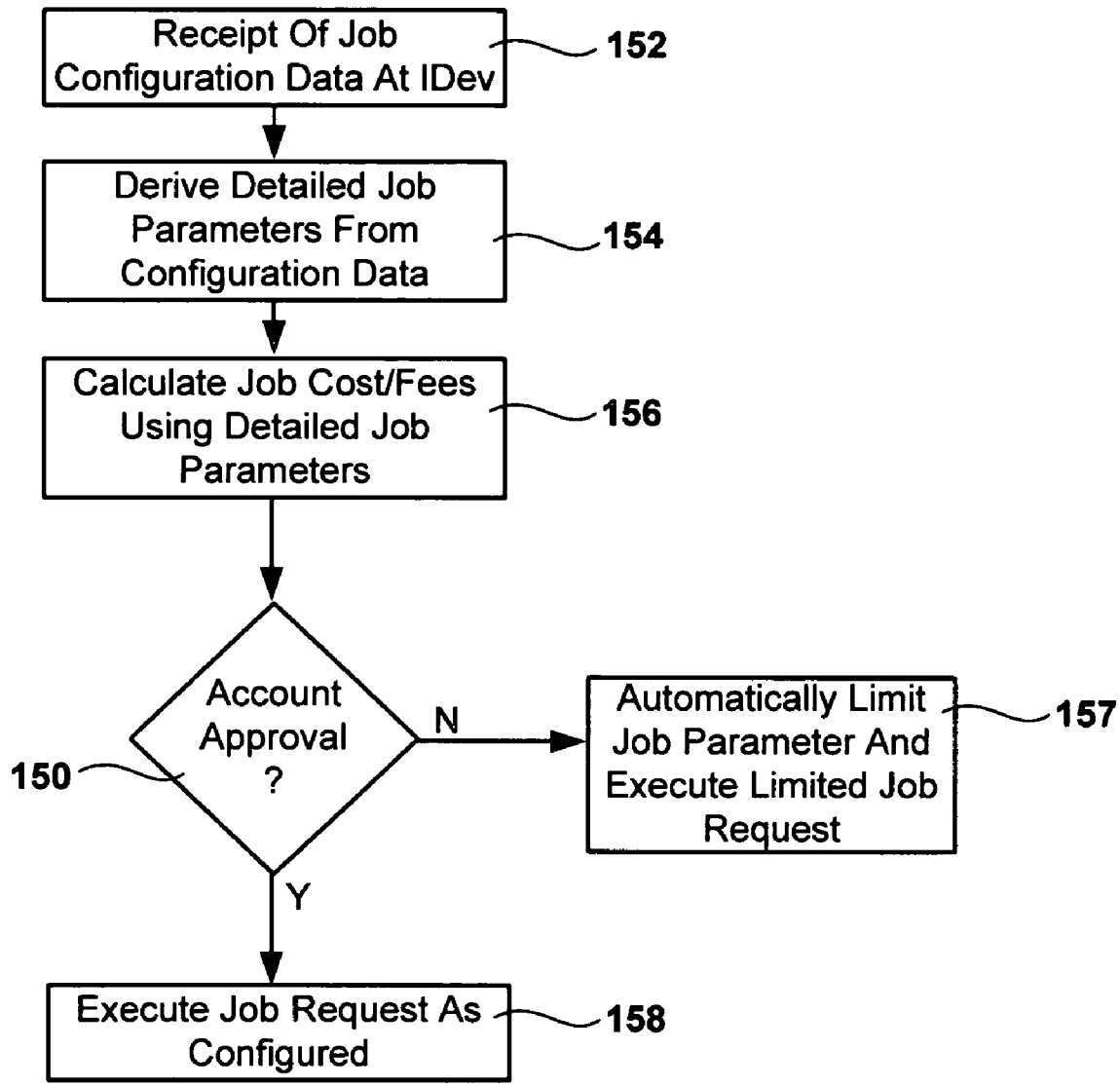
FIG. 15 is a chart showing the steps of a method executed by some stand-alone IDev embodiments comprising accounting authorization and automatic job modification.

Some embodiments of the present invention, illustrated in FIG. 15, comprise receiving job configuration data 152 at the IDev UI. Job configuration data may be received as user input at an IDev UI or as instructions received over a communication link. In these embodiments, the IDev receives this job configuration information and derives 154 detailed job parameters from the job configuration data. These detailed parameters 154 may then be used by the IDev to calculate 156 a specific cost or fee for the configured job. This cost or fee may then be related 150 to a user's account status to determine whether the job can be completed within accounting restrictions. For example, a user's account may be checked to see if sufficient credit is available to cover the fees associated with the imaging job. If the account status will allow the job, the IDev may complete the job 158. If the account status will not allow the job 157, the IDev may modify the job, by limiting a job parameter or by some other means, until the job costs or fees fall within accounting restrictions. For example, and not by way of limitation, a job that has been configured for 50 copies may be limited 157 to 30 copies when a user's account only has sufficient finds to cover 30 copies. As another non-limiting example, a job may be changed 157 from color copies on photo paper to color copies on bond paper when this change will bring the job into compliance with accounting restrictions.

Figure 16:
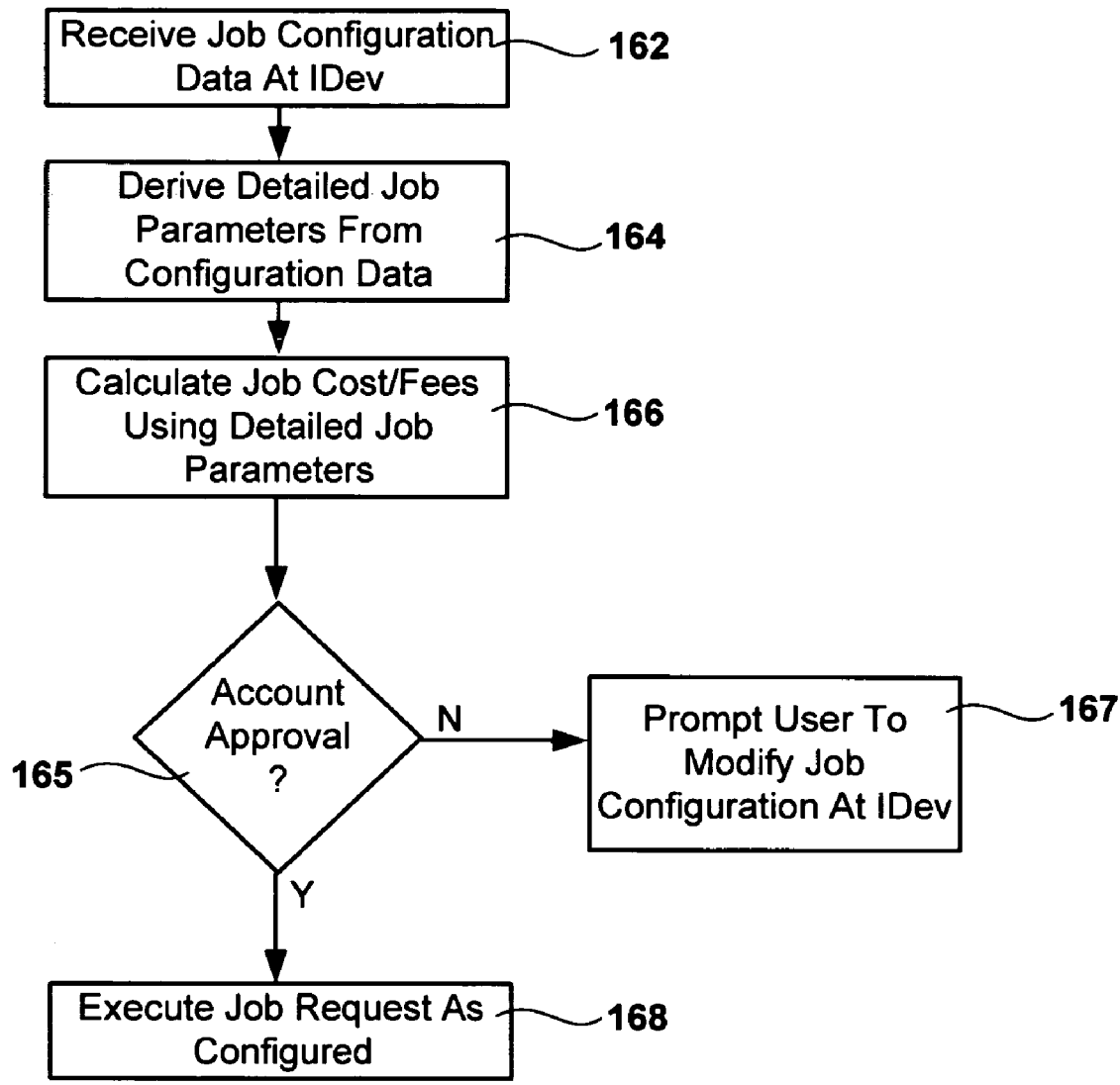
FIG. 16 is a chart showing the steps of a method executed by some stand-alone IDev embodiments comprising accounting authorization and user prompting for job modification.

Some embodiments of the present invention, illustrated in FIG. 16, comprise receiving 162 job configuration data at an IDev. In these embodiments, the IDev derives 164 detailed job parameters from the job configuration data. Job costs or fees may then be calculated 166 using these detailed job parameters as explained for other embodiments above. When account restrictions are met, 165 the job request may be executed 168 as configured. In these embodiments, if account restrictions are not met 167, a user may be prompted to modify the job configuration. This may be accomplished by input on an imaging device user interface. In some embodiments, the IDev may prompt the user with data indicating which configuration characteristics may be changed to make the job comply with accounting restrictions.

Figure 17:
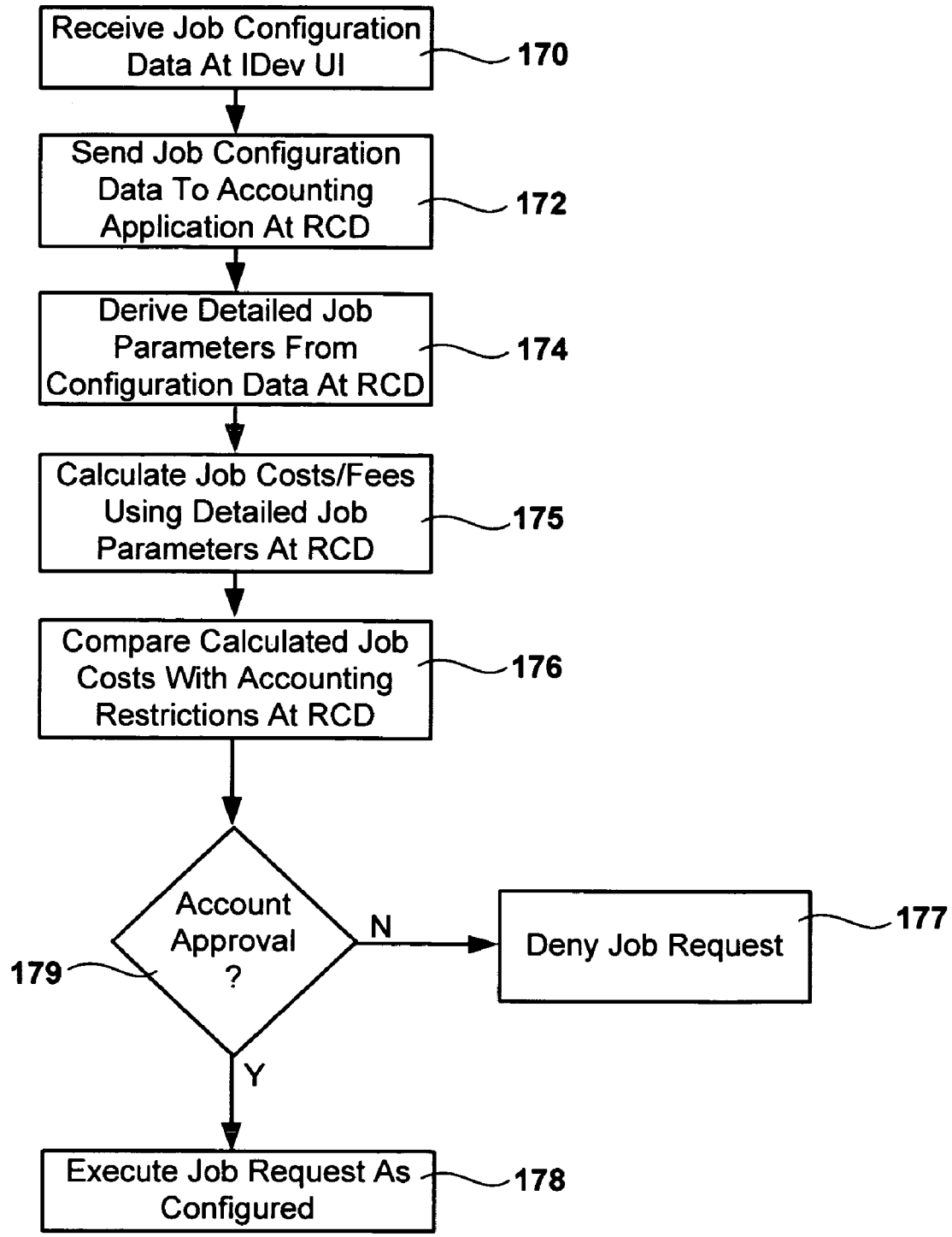
FIG. 17 is a chart showing the steps of a method executed by some system embodiments comprising accounting authorization.

Some embodiments of the present invention may be described with reference to FIGS. 10, 12 & 17. In these embodiments, user input may be entered on the user interface 124 of an imaging device 120. Job configuration data may also be received from other devices via a communication link, such as a network connection 100, 122. User input data received on an IDev 120, 30a-30d may be sent over a communication link 100, 126 to a RCD 60, 126a-b. In some of these embodiments, a user may be prompted to configure a job by input on an imaging device user interface 124. In other embodiments, job configuration data may be received directly from another device. Once the job configuration data is received 170 at the IDev 120, 30a-30d, this data may be sent 172 to an RCD 60, 126a-b. At the RCD 60, 126a-b, the configuration data may be processed and detailed job parameters may be derived 174 therefrom. Job costs and fees may then be calculated 175 from the detailed job parameters at the RCD 60, 126a-b. These job costs and fees may then be compared or related 176 to a user's account to determine whether account restrictions will allow the job to be executed. If the account restrictions allow 179 the job, the RCD 60, 126a-b may send an authorization 178 to the IDev 120, 30a-30d to execute the job as configured. If the account restrictions do not allow 179 the job, the RCD 60, 126a-b may send a job denial notice 177 to the IDev 120, 30a-30d to notify the user that the job cannot be executed as configured under current accounting restrictions.

Figure 18:
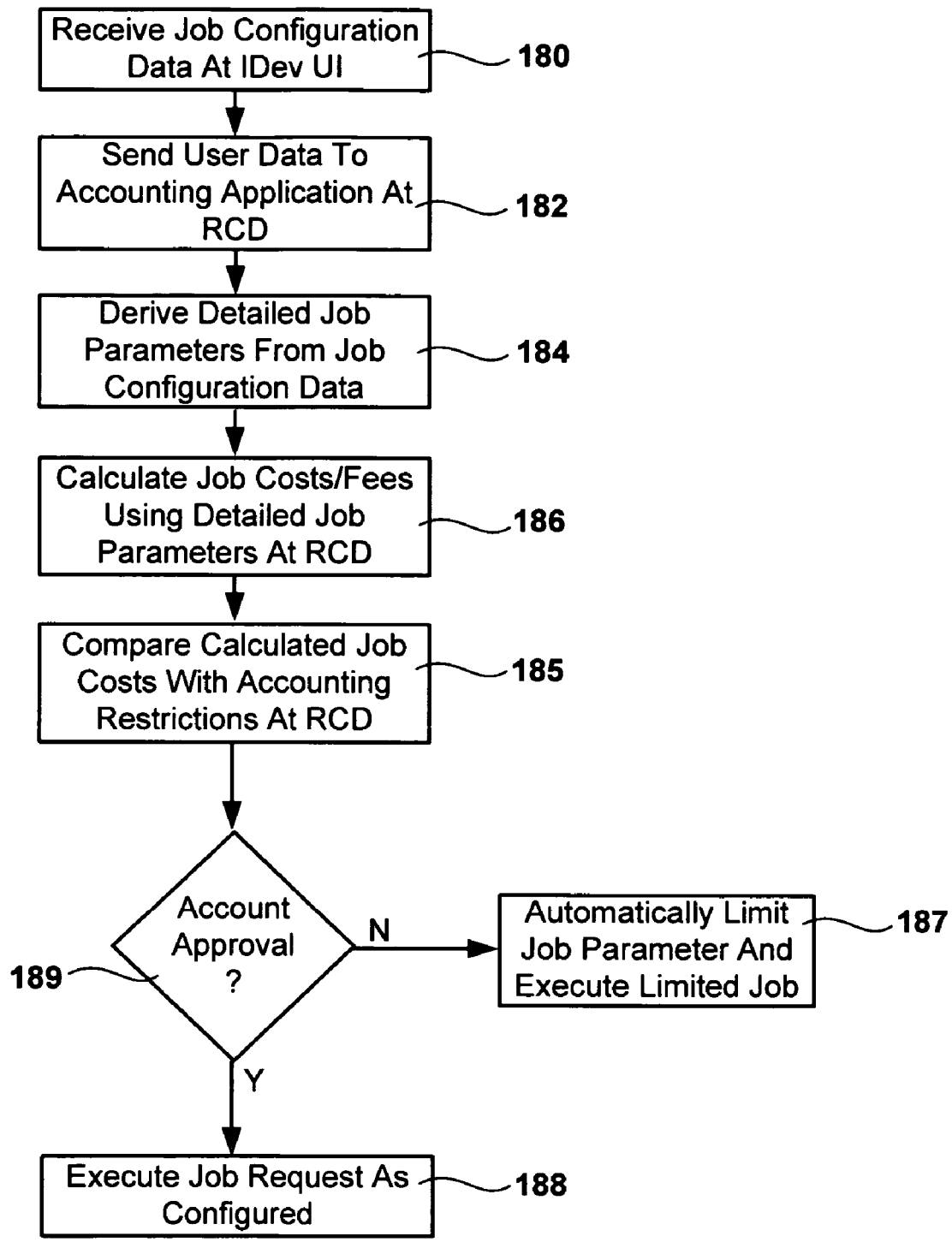
FIG. 18 is a chart showing the steps of a method executed by some system embodiments comprising accounting authorization and automatic job modification.

In further embodiments, illustrated in FIG. 18, job configuration data may be received 180 by an IDev 120, 30a-30d. The IDev 120, 30a-30d may then send 182 the job configuration data to an RCD 60, 126a-b for processing. As in some other embodiments, an application running on the RCD 60, 126a-b may then derive 184 detailed job parameters from the configuration data. An RCD application may also calculate 186 Job costs and fees from the detailed job parameters. Once costs and fees are calculated for the job, account status may be checked 185 to see if accounting restrictions will allow the job to be authorized 189. When accounting restrictions are met 179, a job authorization message may be sent to the IDev 120, 30a-30d to authorize execution of the job as configured. When accounting restrictions are not met, the job may be reconfigured 187 to a configuration that meets accounting restrictions and sent to the IDev 120, 30a-30d for execution. In some embodiments, a user prompt may be displayed to obtain user approval of the reconfiguration. Job reconfiguration may comprise limiting aspects of the job. In some embodiments, the quantity of job iterations may be limited, such as the number of pages of a copy job. In other embodiments, the quality of a job aspect may be reduced, such as the size of an image, until accounting restrictions are met.

Figure 19:
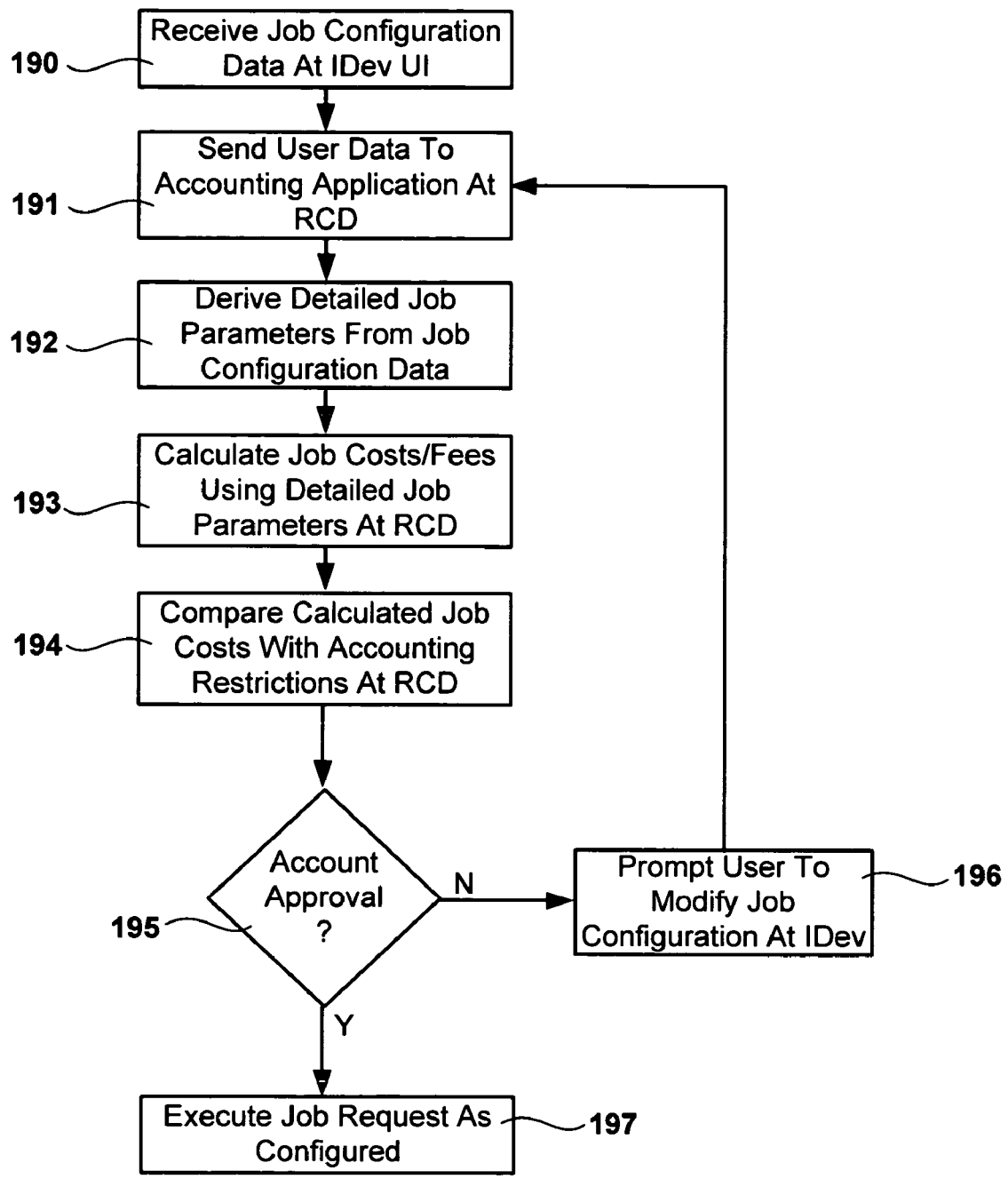
FIG. 19 is a chart showing the steps of a method executed by some system embodiments comprising accounting authorization and user prompting for job modification.

In still other embodiments of the present invention, illustrated in FIG. 19, job configuration data may be received 190 by an IDev 120, 30a-30d. The IDev 120, 30a-30d may then send 191 the job configuration data to an RCD 60, 126a-b for processing. As in some other embodiments, an application running on the RCD 60, 126a-b may then derive 192 detailed job parameters from the configuration data. An RCD application may also calculate 193 job costs and fees from the detailed job parameters. Once costs and fees are calculated for the job, account status or accounting restrictions may be checked 194 to see if accounting restrictions will allow the job to be authorized 195. When accounting restrictions are met 195, a job authorization message may be sent to the IDev 120, 30a-30d to authorize execution of the job as configured. When accounting restrictions are not met 195, the user may be notified of the lack of authorization and prompted 196 to reconfigure the job to comply with accounting restrictions. The modified job configuration may then be sent to the IDev 120, 30a-30d for processing and account restriction compliance checking similar to the original configuration processing.

Figure 20:
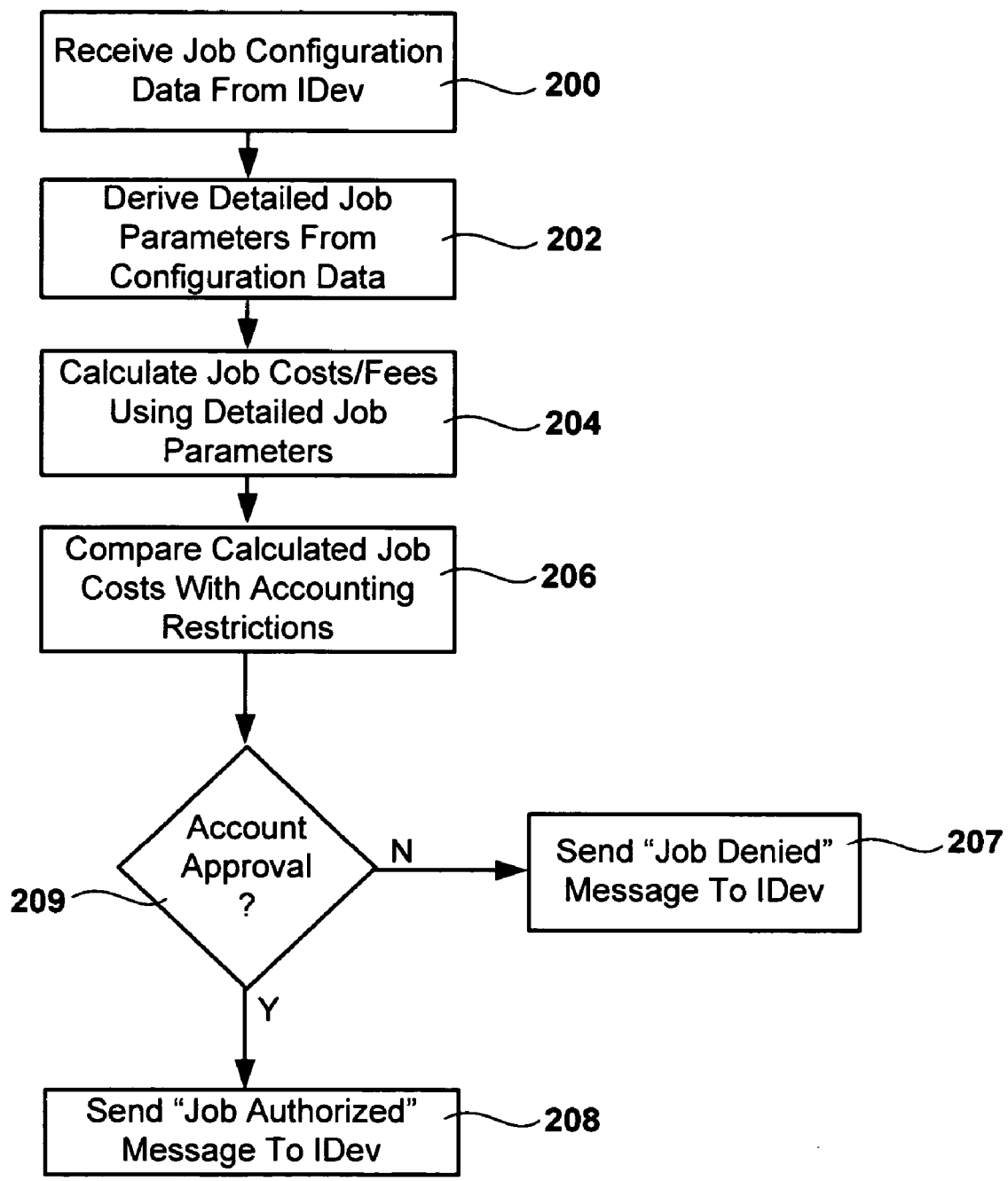
FIG. 20 is a chart showing the steps of a method executed by some RCD embodiments comprising accounting authorization.

Some embodiments of the present invention comprise a remote computing device configured to work in conjunction with an imaging device in a system such as those described above in relation to FIGS. 17-19. Some of these embodiments, illustrated in FIG. 20, comprise a remote computing device, (RCD) capable of receiving 200 print job or imaging job configuration data from an IDev 120, 30a-30d. The RCD 60, 126a-b of these embodiments is also configured to derive 202 detailed job parameters from the job configuration data. Job costs and fees may then be calculated 204 using these detailed job parameters. Once job costs and fees have been calculated, these values may be compared 206 with user account restrictions. Upon accounting approval 209 of a job, a job authorization message is sent from the RCD 60, 126a-b to an IDev 120, 30a-30d to authorize the IDev 120, 30a-30d to execute the job as configured. In these embodiments, when a job does not meet accounting restrictions, no authorization message is sent to the IDev 120, 30a-30d. Alternatively, a job denied message may be sent to deny authority to execute the job as configured.

Figure 21:
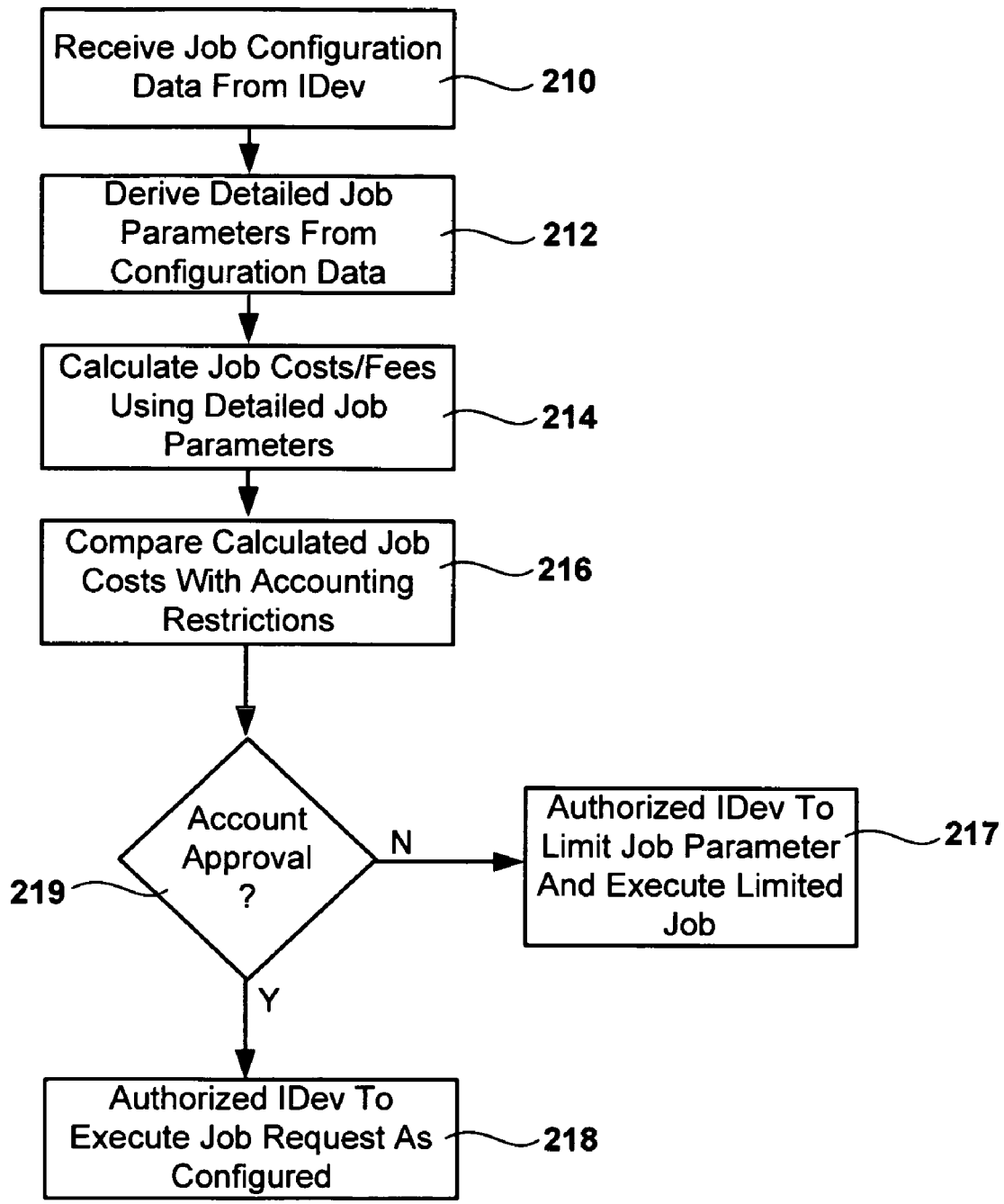
FIG. 21 is a chart showing the steps of a method executed by some RCD embodiments comprising accounting authorization and automatic job modification.

Further embodiments, illustrated in FIG. 21, comprise a remote computing device, (RCD) capable of receiving 210 print job or imaging job configuration data from an IDev 120, 30a-30d. The RCD 60, 126a-b of these embodiments is also configured to derive 212 detailed job parameters from the job configuration data. Job costs and fees may then be calculated 214 using these detailed job parameters. Once job costs and fees have been calculated, these values may be compared 216 with user account restrictions. Upon accounting approval 219 of a job, a job authorization message 218 may be sent from the RCD 60, 126a-b to an IDev 120, 30a-30d to authorize the IDev 120, 30a-30d to execute the job as configured. In these embodiments, when a job does not meet 219 accounting restrictions, the RCD sends output 217 to the IDev to modify the job to meet accounting restrictions and execute the modified job. Alternatively, the RCD 60, 126a-b may modify the job to meet accounting restrictions and send the modified job along with an accounting authorization to the IDev 120, 30a-30d for execution of the modified job.

Figure 22:
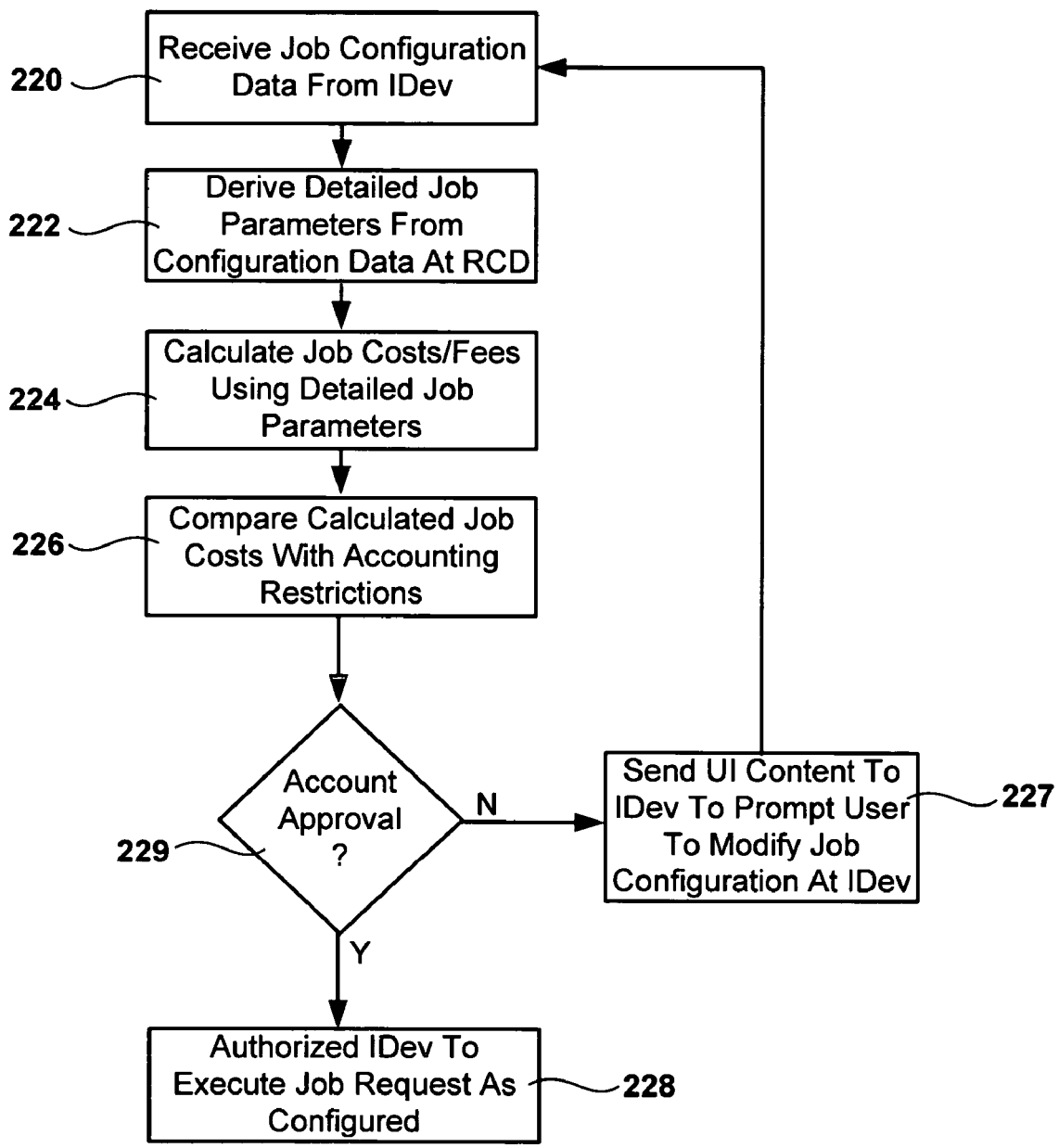
FIG. 22 is a chart showing the steps of a method executed by some RCD embodiments comprising accounting authorization and user prompting for job modification.

Further embodiments, illustrated in FIG. 22, comprise a remote computing device, (RCD) capable of receiving 220 print job or imaging job configuration data from an IDev 120, 30a-30d. The RCD 60, 126a-b of these embodiments is also configured to derive 222 detailed job parameters from the job configuration data. Job costs and fees may then be calculated 224 using these detailed job parameters. Once job costs and fees have been calculated, these values may be compared 226 with user account restrictions. Upon accounting approval 229 of a job, a job authorization message 228 may be sent from the RCD 60, 126a-b to an IDev 120, 30a-30d to authorize the IDev 120, 30a-30d to execute the job as configured. In these embodiments, when a job does not meet 229 accounting restrictions, the RCD 60, 126a-b may send UI content to the IDev 120, 30a-30d to prompt a user to modify the job configuration at the IDev 120, 30a-30d UI. Once a user has modified the imaging job, the reconfigured or modified job may be sent to the RCD 60, 126a-b and processed to verify accounting restriction compliance as was done for the original job. A plurality of modification iterations may be performed until accounting restriction compliance is resolved.

Some embodiments of the present invention comprise imaging devices configured to work in conjunction with remote computing devices in exemplary systems such as those described above in relation to FIGS. 17-19.

Figure 23:
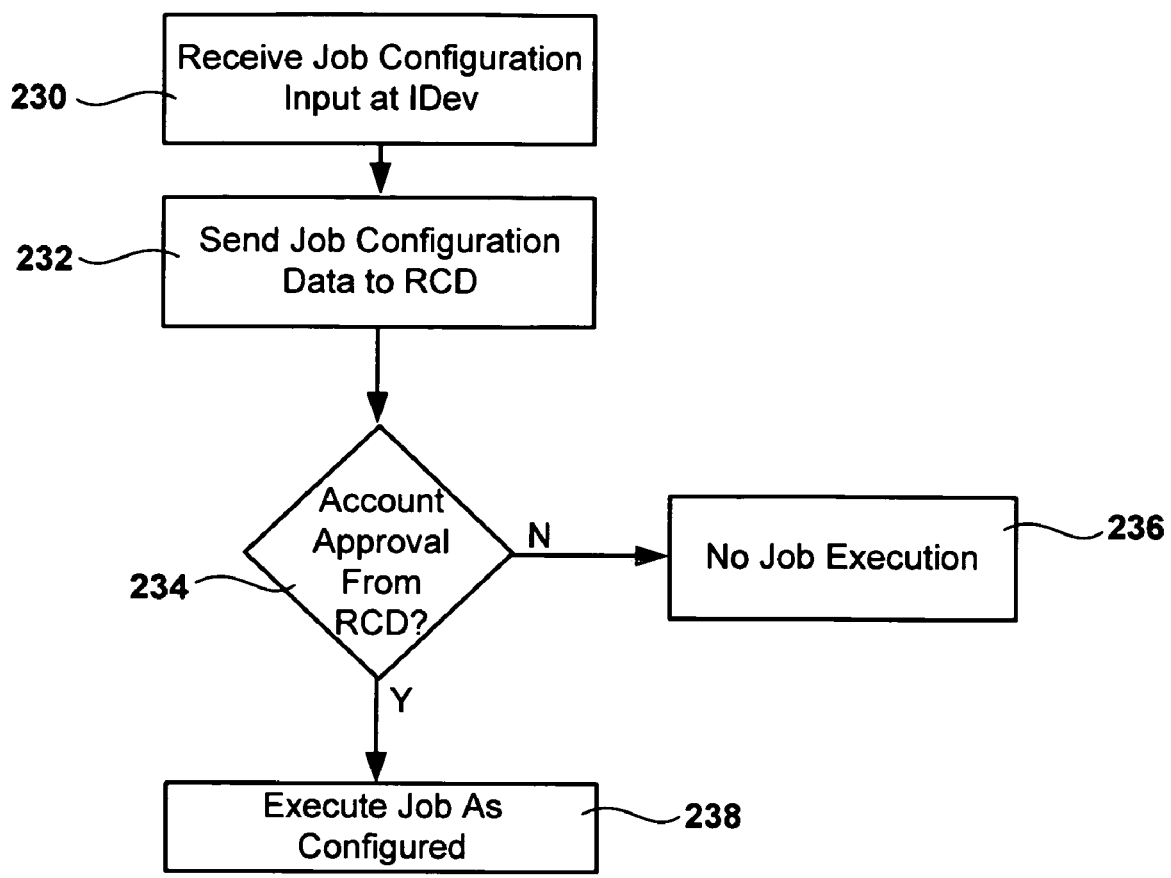
FIG. 23 is a chart showing the steps of a method executed by some IDev embodiments comprising accounting authorization.

Some embodiments of the present invention, illustrated in FIG. 23, comprise an IDev 120, 30a-30d that is capable of receiving 230 job configuration data from a user. This job configuration data may be received directly from a user through an UI on the IDev 120, 30a-30d. Job configuration data may also be transmitted from a remote device that has received user input directly. Job configuration data may also be received as a set of commands from another device in an automated system or from other sources. Once this job configuration data is received 230, it may be sent 232 to an RCD 60, 126a-b for processing. The RCD 60, 126a-b may process the data and determine whether the job complies with accounting restrictions as described above. When this determination has been made and the job configuration receives accounting approval 238 the IDev 120, 30a-30d may execute the job as configured. If the job configuration does not receive accounting approval or if a job denial 236 message is received, the job will not be executed.

Figure 24:
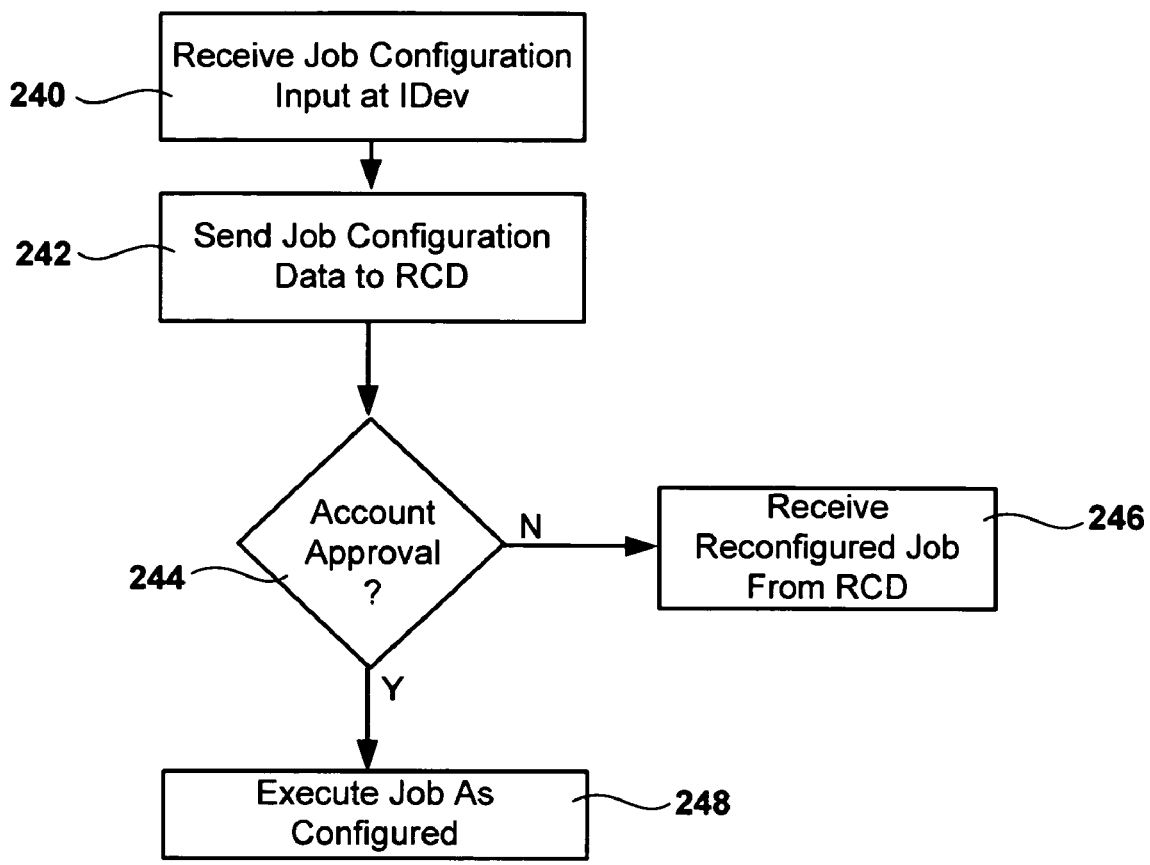
FIG. 24 is a chart showing the steps of a method executed by some IDev embodiments comprising accounting authorization and automatic job modification.

Some embodiments of the present invention, illustrated in FIG. 24, comprise an IDev 120, 30a-30d that is capable of receiving 240 job configuration data from a user. This job configuration data may be received directly from a user through an UI on the IDev 120, 30a-30d. Job configuration data may also be transmitted from a remote device that has received user input directly. Job configuration data may also be received as a set of commands from another device in an automated system or from other sources. Once this job configuration data is received 240, it may be sent 242 to an RCD 60, 126a-b for processing. The RCD 66, 126a-b may process the data and determine whether the job complies with accounting restrictions as described above. When this determination has been made and the job configuration receives accounting approval 248 the IDev 120, 30a-30d may execute the job as configured. If the job configuration does not receive accounting approval or if a job denial 246 message is received, the job may be reconfigured to comply with accounting restrictions. In some embodiments, the IDev 120, 30a-30d may reconfigure the job configuration to meet accounting restrictions and execute the job. In some embodiments, a user may be prompted to approve the reconfigured job before execution. In other embodiments, the RCD 60, 126a-b may send a reconfigured job to the IDev 120, 30a-30d for execution when the original job does not meet accounting restrictions.

Figure 25:
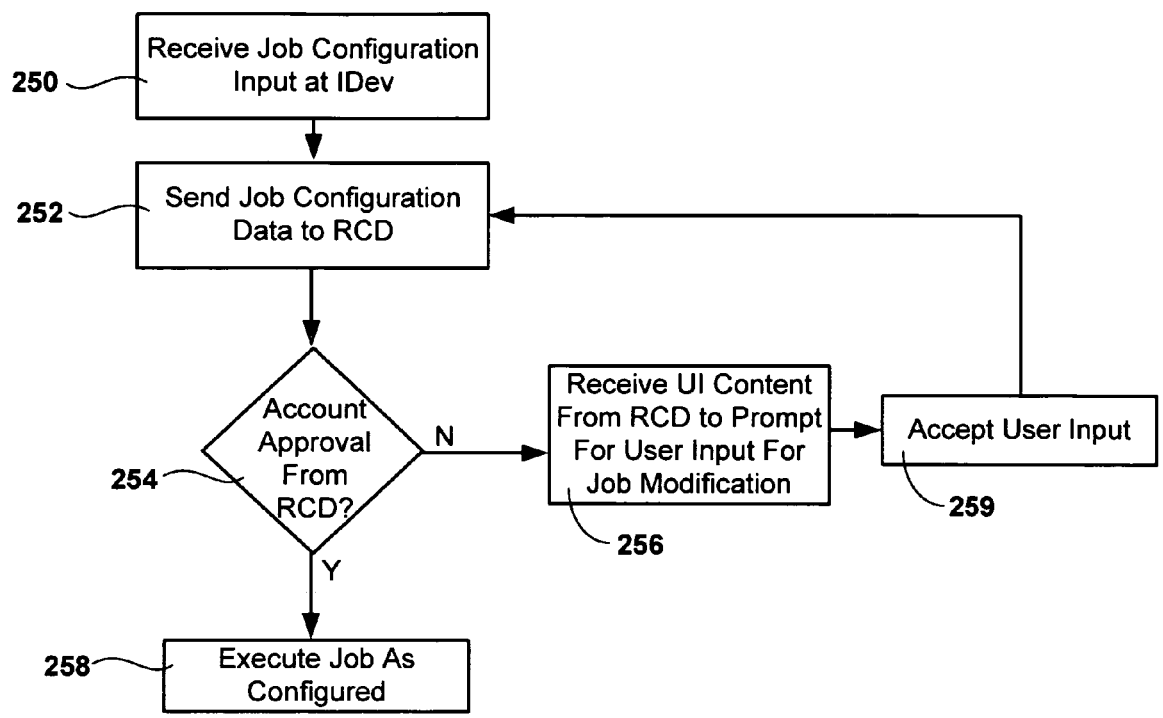
FIG. 25 is a chart showing the steps of a method executed by some IDev embodiments comprising accounting authorization and user prompting for job modification.

Some embodiments of the present invention, illustrated in FIG. 25, comprise an IDev 120, 30a-30d that is capable of receiving 250 job configuration data from a user. This job configuration data may be received directly from a user through an UI on the IDev 120, 30a-30d. Job configuration data may also be transmitted from a remote device that has received user input directly. Job configuration data may also be received as a set of commands from another device in an automated system or from other sources. Once this job configuration data is received 250, it may be sent 252 to an RCD 60, 126*a-b* for processing. The RCD 60, 126*a-b* may process the data and determine whether the job complies with accounting restrictions as described above. When this determination has been made and the job configuration receives accounting approval 258 the IDev 120, 30*a*-30*d* may execute the job as configured. If the job configuration does not receive accounting approval or if a job denial message is received, the IDev 120, 30*a*-30*d* may prompt 256 a user to modify the job configuration to meet accounting restrictions. In some embodiments, UI content may be sent to the IDev 120, 30*a*-30*d* UI for display to a user. User input may then be received 259 and the newly-configured job may be sent 252 back to the RCD for accounting approval.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

We claim:

1. A method for imaging device accounting, said method comprising:
   a) taking control of an imaging device (IDev) user interface (UI) with a remote computing device (RCD) application, wherein said RCD is remote to said IDev and said control is established through a user interface application programming interface (UI API), wherein said UI API allows input on said IDev UI to be intercepted and sent to said RCD application and said UI API allows UI display content sent from said RCD application to be displayed on said IDev UI;
   b) sending UI display content from said RCD to said IDev for display on said IDev UI via said UI API;
   c) receiving job configuration data, through said IDev UI and said UI API, at said remote computing device (RCD), for a job to be performed at said IDev;
   d) receiving pixel data, at said RCD from said IDev, for said job to be performed at said IDev;
   e) deriving detailed job parameters from said job configuration data and said pixel data at said RCD;
   f) calculating a job charge using said detailed job parameters at said RCD;
   g) accessing account data comprising accounting restrictions with said RCD;
   h) determining whether said accounting restrictions will allow said job to be executed based on said job charge; and
   i) sending a job authorization to said IDev UI when said job complies with said accounting restrictions.

2. A method as described in claim 1 further comprising denying authorization for said job when said job does not comply with said accounting restrictions.

3. A method as described in claim 1 further comprising automatically modifying said job when said job does not comply with said accounting restrictions.

4. A method as described in claim 1 further comprising prompting a user to modify said job when said job does not comply with said accounting restrictions.

5. A method as described in claim 1 wherein said sending is accomplished via an XML/SOAP message.

6. A method as described in claim 1 wherein said receiving said job configuration data is accomplished via an XML/SOAP message.

7. A method as described in claim 1 wherein said deriving detailed job parameters comprises calculation of a parameter that is not directly input by a user.

8. A method as described in claim 1 wherein said deriving detailed job parameters comprises measurement of a parameter that is not directly input by a user.

9. A method as described in claim 8 wherein said measurement of a parameter that is not directly input by a user comprises measurement of consumable resources.

10. A method as described in claim 1 wherein said detailed job parameters comprise a parameter selected from the set consisting of: media type, media size, media quantity, quantity of impressions per page, pixel count data, image resolution, finishing operations, stapling requirements, punching requirements, collating requirements, color attributes, color depth, color quantity, ink consumption, toner consumption, contrast media consumption, monochrome attributes, greyscale attributes, double sided characteristics, single-sided characteristics, N-Up formatting, paper tray selection, scan destination, print destination, power consumption and job type.

11. A method as described in claim 1 wherein said job charge is proportional to an aggregate cost of all materials and resources used for said job.

12. A method for imaging device accounting, said method comprising:
    a) taking control of an imaging device (IDev) user interface (UI) with a remote computing device (RCD) application, wherein said RCD is remote to said IDev and said control is established through a user interface application programming interface (UI API), wherein said UI API allows input on said IDev UI to be intercepted and sent to said RCD application and said UI API allows UI display content sent from said RCD application to be displayed on said IDev UI;
    b) sending UI display content from said RCD to said IDev for display on said IDev UI via said UI API;
    c) receiving job configuration data, through said IDev UI and said UI API, at said remote computing device (RCD), for a job to be performed at said IDev;
    d) receiving pixel data, at said RCD from said IDev, for said job to be performed at said IDev;
    e) deriving detailed job parameters from said job configuration data and said pixel data at said RCD;
    f) calculating a job charge using said detailed job parameters at said RCD;
    g) sending said job charge data to a remote accounting application to determine whether said job charge meets accounting restrictions;
    h) receiving an accounting job authorization from said remote accounting application when said job charge meets said accounting restrictions; and
    i) sending a job execution authorization to said IDev when said job accounting authorization is received at said RCD.

13. A method as described in claim 12 wherein said receiving an accounting job authorization is accomplished via an XML/SOAP message.

14. A method as described in claim 12 wherein said sending a job execution authorization is accomplished via an XML/SOAP message.

15. A method as described in claim 12 wherein said receiving job configuration data is accomplished via an XML/SOAP message.

16. An apparatus for imaging device accounting, said apparatus comprising:
 a) an imaging device remote control application (RCD application) for controlling a user interface (UI) of an imaging device (IDev) that is remote to said RCD application, wherein said RCD application communicates with a UI application programming interface (API) to provide UI display content to said IDev and to receive UI input from said IDev UI;
 b) IDev UI display content for sending to said IDev UI via said RCD application:
 c) a sender for sending said IDev UI content to said IDev UI API:
 d) a configuration data receiver for receiving job configuration data, at said remote computing device (RCD) from said imaging device (IDev) UI, for a job to be performed at said IDev;
 e) a pixel-data receiver for receiving pixel data, at said RCD from said IDev, for said job to be performed at said IDev;
 f) a deriving processor for deriving detailed job parameters from said job configuration data and said pixel data at said RCD;
 g) a calculator for calculating a job cost using said detailed job parameters at said RCD;
 h) a communication link for accessing account data comprising accounting restrictions with said RCD;
 i) an accounting processor for determining whether said accounting restrictions will allow said job to be executed based on said job cost; and
 j) a sender for sending a job authorization to said IDev when said job complies with said accounting restrictions.

17. An apparatus as described in claim 16 wherein said RCD application receives job configuration data as an XML/SOAP message.

18. An apparatus as described in claim 16 wherein said sender sends said job authorization as an XML/SOAP message.

19. An apparatus as described in claim 16 further comprising a job modifier for automatically modifying said job when said job does not comply with said accounting restrictions.

20. An apparatus as described in claim 16 further comprising a prompter for prompting a user to modify said job when said job does not comply with said accounting restrictions.

* * * * *